United States Patent
Palmer et al.

(10) Patent No.: US 11,069,257 B2
(45) Date of Patent: Jul. 20, 2021

(54) SYSTEM AND METHOD FOR DETECTING A VEHICLE EVENT AND GENERATING REVIEW CRITERIA

(71) Applicant: SmartDrive Systems, Inc., San Diego, CA (US)

(72) Inventors: Jason Palmer, Carlsbad, CA (US); Slaven Sljivar, San Diego, CA (US); Mark Freitas, San Diego, CA (US); Daniel A. Deninger, Carlsbad, CA (US); Jeffrey Todd Griswold, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 761 days.

(21) Appl. No.: 14/540,825

(22) Filed: Nov. 13, 2014

(65) Prior Publication Data

US 2016/0140872 A1    May 19, 2016

(51) Int. Cl.
*B60R 1/00*    (2006.01)
*G09B 19/16*    (2006.01)
(Continued)

(52) U.S. Cl.
CPC .............. *G09B 19/167* (2013.01); *B60R 1/00* (2013.01); *G06K 9/00711* (2013.01);
(Continued)

(58) Field of Classification Search
CPC ... G09B 9/04; G09B 9/00; G09B 9/02; G09B 9/048; G09B 9/05; G09B 9/052
See application file for complete search history.

(56) References Cited

U.S. PATENT DOCUMENTS

| 673,203 A | 4/1901 | Freund |
| 673,795 A | 5/1901 | Hammer |

(Continued)

FOREIGN PATENT DOCUMENTS

| CA | 2469728 | 12/2005 |
| CA | 2469728 A1 | 12/2005 |

(Continued)

OTHER PUBLICATIONS

PCT International Search Report and Written Opinion for PCT/IB16/51863, dated Sep. 16, 2016.
(Continued)

*Primary Examiner* — Bruk A Gebremichael
(74) *Attorney, Agent, or Firm* — Esplin & Associates, PC

(57) ABSTRACT

This disclosure relates to a system and method for detecting vehicle events and generating review criteria based on the detected vehicle events. Some or all of the system may be installed in a vehicle and/or be otherwise coupled with a vehicle. The system may include one or more sensors configured to generate output signals conveying information related to the vehicle and/or multiple video capture devices configured to acquire visual output information representing a vehicle environment. In some implementations, the system may determine a vehicle event type based on the information conveyed by the output signals. The system may generate review criteria, which correspond to the vehicle event, based on the vehicle event type and the fields of view corresponding to the video capture devices.

22 Claims, 7 Drawing Sheets

(51) Int. Cl.
  *G06K 9/00* (2006.01)
  *G09B 5/02* (2006.01)
(52) U.S. Cl.
  CPC ......... *G06K 9/00791* (2013.01); *G09B 5/02* (2013.01); *B60R 2300/105* (2013.01); *B60R 2300/205* (2013.01); *B60R 2300/80* (2013.01); *G06K 2009/00738* (2013.01)

(56) References Cited

U.S. PATENT DOCUMENTS

| | | |
|---|---|---|
| 673,907 A | 5/1901 | Johnson |
| 676,075 A | 6/1901 | McDougall |
| 679,511 A | 7/1901 | Richards |
| 681,036 A | 8/1901 | Burg |
| 681,283 A | 8/1901 | Waynick |
| 681,998 A | 9/1901 | Swift |
| 683,155 A | 9/1901 | Thompson |
| 683,214 A | 9/1901 | Mansfield |
| 684,276 A | 10/1901 | Lonergan |
| 685,082 A | 10/1901 | Wood |
| 685,969 A | 11/1901 | Campbell |
| 686,545 A | 11/1901 | Selph |
| 689,849 A | 12/1901 | Brown |
| 691,982 A | 1/1902 | Sturgis |
| 692,834 A | 2/1902 | Davis |
| 694,781 A | 3/1902 | Prinz |
| 2,943,141 A | 6/1960 | Knight |
| 3,634,866 A | 1/1972 | Meyer |
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | d'Alayer de Costemore |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Hutter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhaeuser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | Van |
| 5,140,436 A | 8/1992 | Blessinger |
| 5,140,438 A | 8/1992 | Blessinger |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,333,759 A | 8/1994 | Deering |
| 5,343,527 A | 8/1994 | Moore |
| 5,353,023 A | 10/1994 | Mitsugi |
| 5,361,326 A | 11/1994 | Aparicio |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley |
| 5,445,027 A | 8/1995 | Zoerner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Naether |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,505,076 A | 4/1996 | Parkman |
| 5,513,011 A | 4/1996 | Matsumoto |
| 5,515,285 A | 5/1996 | Garrett |
| 5,519,260 A | 5/1996 | Washington |
| 5,521,633 A | 5/1996 | Nakajima |

(56) References Cited

U.S. PATENT DOCUMENTS

| | | |
|---|---|---|
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,596,647 A | 1/1997 | Wakai |
| 5,600,775 A | 2/1997 | King |
| 5,608,272 A | 3/1997 | Tanguay |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van |
| 5,845,733 A | 12/1998 | Wolfsen |
| 5,867,802 A | 2/1999 | Borza |
| 5,877,897 A | 3/1999 | Schofield |
| 5,896,167 A | 4/1999 | Omae |
| 5,897,602 A | 4/1999 | Mizuta |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,959,367 A | 9/1999 | Ofarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,021 A | 7/2000 | Ehlbeck |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Baque |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,266,588 B1 | 7/2001 | McClellan |
| 6,298,290 B1 | 10/2001 | Abe |
| 6,300,875 B1 | 10/2001 | Schafer |
| 6,317,682 B1 | 11/2001 | Ogura |
| 6,324,450 B1 | 11/2001 | Iwama |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,366,207 B1 | 4/2002 | Murphy |

(56) References Cited

U.S. PATENT DOCUMENTS

| | | |
|---|---|---|
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,429,773 B1 | 8/2002 | Schuyler |
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,526,352 B1 | 2/2003 | Breed |
| 6,529,159 B1 | 3/2003 | Fan |
| 6,535,804 B1 | 3/2003 | Chun |
| 6,552,682 B1 | 4/2003 | Fan |
| 6,553,308 B1 | 4/2003 | Uhlmann |
| 6,556,905 B1 | 4/2003 | Mittelsteadt |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,779,716 B1 | 8/2004 | Grow |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | De Leon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,954,689 B2 | 10/2005 | Hanson |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,027,621 B1 | 4/2006 | Prokoski |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose et al. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,548,586 B1 | 6/2009 | Mimar |
| 7,561,054 B2 | 7/2009 | Raz |
| 7,584,033 B2 | 9/2009 | Mittelsteadt |
| 7,596,439 B2 | 9/2009 | Oesterling |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,689,001 B2 | 3/2010 | Kim |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |

(56) References Cited

U.S. PATENT DOCUMENTS

| | | |
|---|---|---|
| 7,783,956 B2 | 8/2010 | Ko |
| 7,804,426 B2 | 9/2010 | Etcheson |
| 7,821,421 B2 | 10/2010 | Tamir |
| 7,845,560 B2 | 12/2010 | Emanuel |
| 7,853,376 B2 | 12/2010 | Peng |
| 7,868,912 B2 | 1/2011 | Venetianer |
| 7,893,958 B1 | 2/2011 | DAgostino |
| 7,904,219 B1 | 3/2011 | Lowrey |
| 7,940,250 B2 | 5/2011 | Forstall |
| 7,941,258 B1 | 5/2011 | Mittelsteadt |
| 7,974,748 B2 | 7/2011 | Goerick |
| 7,984,146 B2 | 7/2011 | Rozak |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,423,009 B2 | 4/2013 | Srinivasan |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,634,958 B1 | 1/2014 | Chiappetta |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,781,292 B1 | 7/2014 | Ross |
| 8,803,695 B2 | 8/2014 | Denson |
| 8,805,110 B2 | 8/2014 | Rhoads |
| 8,849,501 B2 | 9/2014 | Cook |
| 8,855,847 B2 | 10/2014 | Uehara |
| 8,862,395 B2 | 10/2014 | Richardson |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,085,362 B1 | 7/2015 | Kilian |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 9,373,203 B1 | 6/2016 | Fields |
| 9,607,526 B1* | 3/2017 | Hsu-Hoffman ...... G09B 19/167 |
| 9,610,955 B2 | 4/2017 | Palmer |
| 9,715,711 B1 | 7/2017 | Konrardy |
| 9,754,325 B1 | 9/2017 | Konrardy |
| 9,767,516 B1 | 9/2017 | Konrardy |
| 9,786,154 B1 | 10/2017 | Potter |
| 9,792,656 B1 | 10/2017 | Konrardy |
| 9,805,423 B1 | 10/2017 | Konrardy |
| 9,805,601 B1 | 10/2017 | Fields |
| 9,858,621 B1 | 1/2018 | Konrardy |
| 9,868,394 B1 | 1/2018 | Fields |
| 9,870,649 B1 | 1/2018 | Fields |
| 10,222,228 B1 | 3/2019 | Chan |
| 10,360,739 B2 | 7/2019 | Palmer |
| 10,404,951 B2 | 9/2019 | Plante |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1* | 9/2002 | Seaman .................. B60R 11/04 348/148 |
| 2002/0138587 A1 | 9/2002 | Koehler |
| 2002/0156558 A1 | 10/2002 | Hanson |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0170064 A1 | 11/2002 | Monroe |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0055666 A1 | 3/2003 | Roddy |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081123 A1 | 5/2003 | Rupe |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0137194 A1 | 7/2003 | White |
| 2003/0144775 A1 | 7/2003 | Klausner |
| 2003/0152145 A1 | 8/2003 | Kawakita |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters et al. |
| 2003/0201875 A1 | 10/2003 | Kuo |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0032493 A1 | 2/2004 | Franke |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |

(56) References Cited

U.S. PATENT DOCUMENTS

| | | |
|---|---|---|
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0117638 A1 | 6/2004 | Monroe |
| 2004/0135979 A1 | 7/2004 | Hazelton |
| 2004/0138794 A1 | 7/2004 | Saito |
| 2004/0145457 A1 | 7/2004 | Schofield et al. |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2004/0257208 A1 | 12/2004 | Huang |
| 2004/0267419 A1 | 12/2004 | Jeng |
| 2005/0021199 A1 | 1/2005 | Zimmerman |
| 2005/0038581 A1 | 2/2005 | Kapolka |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0068417 A1 | 3/2005 | Kreiner |
| 2005/0073585 A1 | 4/2005 | Ettinger |
| 2005/0078423 A1 | 4/2005 | Kim |
| 2005/0083404 A1 | 4/2005 | Pierce |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0152353 A1 | 7/2005 | Couturier |
| 2005/0159964 A1 | 7/2005 | Sonnenrein |
| 2005/0166258 A1 | 7/2005 | Vasilevsky |
| 2005/0168258 A1 | 7/2005 | Vasilevsky |
| 2005/0171663 A1 | 8/2005 | Mittelsteadt |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Hoist |
| 2005/0200714 A1 | 9/2005 | Marchese |
| 2005/0203683 A1 | 9/2005 | Olsen |
| 2005/0205719 A1 | 9/2005 | Hendrickson |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0243171 A1 | 11/2005 | Ross, Sr. |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0025907 A9 | 2/2006 | Kapolka |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | Dewaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0158349 A1 | 7/2006 | Oesterling |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly et al. |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0259933 A1 | 11/2006 | Fishel |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0088488 A1 | 4/2007 | Reeves |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |

(56) References Cited

U.S. PATENT DOCUMENTS

| | | |
|---|---|---|
| 2007/0159309 A1 | 7/2007 | Ito |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0213920 A1 | 9/2007 | Igarashi |
| 2007/0216521 A1 | 9/2007 | Guensler |
| 2007/0219685 A1 | 9/2007 | Plante |
| 2007/0219686 A1 | 9/2007 | Plante |
| 2007/0236474 A1 | 10/2007 | Ramstein |
| 2007/0241874 A1 | 10/2007 | Okpysh |
| 2007/0244614 A1 | 10/2007 | Nathanson |
| 2007/0253307 A1 | 11/2007 | Mashimo |
| 2007/0256481 A1 | 11/2007 | Nishiyama |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | Demarco |
| 2007/0262855 A1 | 11/2007 | Zuta |
| 2007/0263984 A1 | 11/2007 | Sterner |
| 2007/0268158 A1 | 11/2007 | Gunderson |
| 2007/0271105 A1 | 11/2007 | Gunderson |
| 2007/0273480 A1 | 11/2007 | Burkman |
| 2007/0280677 A1 | 11/2007 | Demarco |
| 2007/0279214 A1 | 12/2007 | Buehler |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0137912 A1 | 6/2008 | Kim |
| 2008/0143834 A1* | 6/2008 | Comeau ............... H04N 7/18 348/148 |
| 2008/0147267 A1 | 6/2008 | Plante et al. |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0195261 A1 | 8/2008 | Breed |
| 2008/0204556 A1 | 8/2008 | de Miranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard et al. |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff et al. |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1 | 12/2009 | Mouilleseaux |
| 2010/0030423 A1 | 2/2010 | Nathanson |
| 2010/0045451 A1 | 2/2010 | Periwal |
| 2010/0047756 A1 | 2/2010 | Schneider |
| 2010/0049516 A1 | 2/2010 | Talwar |
| 2010/0054709 A1 | 3/2010 | Misawa |
| 2010/0057342 A1 | 3/2010 | Muramatsu |
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1 | 4/2010 | Lee |
| 2010/0104199 A1 | 4/2010 | Zhang |
| 2010/0149418 A1 | 6/2010 | Freed |
| 2010/0153146 A1 | 6/2010 | Angell |
| 2010/0157061 A1 | 6/2010 | Katsman |
| 2010/0191411 A1 | 7/2010 | Cook |
| 2010/0201875 A1 | 8/2010 | Rood |
| 2010/0220892 A1 | 9/2010 | Kawakubo |
| 2010/0250020 A1 | 9/2010 | Lee |
| 2010/0250021 A1 | 9/2010 | Cook |
| 2010/0250022 A1 | 9/2010 | Hines |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0153367 A1 | 6/2011 | Amigo |
| 2011/0161116 A1 | 6/2011 | Peak |
| 2011/0166773 A1 | 7/2011 | Raz |
| 2011/0169625 A1 | 7/2011 | James |
| 2011/0172864 A1 | 7/2011 | Syed |
| 2011/0173015 A1 | 7/2011 | Chapman |
| 2011/0208428 A1 | 8/2011 | Matsubara |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1 | 10/2011 | Perkins |
| 2011/0254676 A1 | 10/2011 | Marumoto |
| 2011/0257882 A1 | 10/2011 | McBurney |
| 2011/0273568 A1 | 11/2011 | Lagassey |
| 2011/0282542 A9* | 11/2011 | Nielsen ................. G07C 5/085 701/31.4 |
| 2011/0283223 A1 | 11/2011 | Vattinen et al. |
| 2011/0304446 A1 | 12/2011 | Basson |
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0065834 A1 | 3/2012 | Senart |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1 | 7/2012 | Taneyhill |
| 2012/0190001 A1 | 7/2012 | Knight |
| 2012/0198317 A1 | 8/2012 | Eppolito |
| 2012/0210252 A1 | 8/2012 | Fedoseyeva |
| 2012/0277950 A1 | 11/2012 | Plante |
| 2012/0280835 A1 | 11/2012 | Raz |
| 2012/0283895 A1 | 11/2012 | Noda |
| 2012/0330528 A1 | 12/2012 | Schwindt |
| 2013/0004138 A1 | 1/2013 | Kilar |
| 2013/0006469 A1 | 1/2013 | Green |
| 2013/0021148 A1 | 1/2013 | Cook |
| 2013/0028320 A1 | 1/2013 | Gardner |
| 2013/0030660 A1 | 1/2013 | Fujimoto |
| 2013/0046449 A1 | 2/2013 | Yuecel |

(56) References Cited

U.S. PATENT DOCUMENTS

| | | | |
|---|---|---|---|
| 2013/0052614 A1 | 2/2013 | Mollicone |
| 2013/0073112 A1 | 3/2013 | Phelan |
| 2013/0073114 A1 | 3/2013 | Nemat-Nasser |
| 2013/0096731 A1 | 4/2013 | Tamari |
| 2013/0127980 A1 | 5/2013 | Haddick |
| 2013/0145269 A1 | 6/2013 | Latulipe |
| 2013/0151980 A1 | 6/2013 | Lee |
| 2013/0170762 A1 | 7/2013 | Marti |
| 2013/0189649 A1 | 7/2013 | Mannino |
| 2013/0197774 A1 | 8/2013 | Denson |
| 2013/0209968 A1 | 8/2013 | Miller |
| 2013/0274950 A1 | 10/2013 | Richardson |
| 2013/0278631 A1 | 10/2013 | Border |
| 2013/0317711 A1 | 11/2013 | Plante |
| 2013/0332004 A1 | 12/2013 | Gompert et al. |
| 2013/0345927 A1 | 12/2013 | Cook |
| 2013/0345929 A1 | 12/2013 | Bowden |
| 2014/0025225 A1 | 1/2014 | Armitage |
| 2014/0025254 A1 | 1/2014 | Plante |
| 2014/0032062 A1 | 1/2014 | Baer |
| 2014/0046550 A1 | 2/2014 | Palmer |
| 2014/0047371 A1 | 2/2014 | Palmer |
| 2014/0058583 A1 | 2/2014 | Kesavan |
| 2014/0089504 A1 | 3/2014 | Scholz |
| 2014/0094992 A1 | 4/2014 | Lambert |
| 2014/0098228 A1 | 4/2014 | Plante |
| 2014/0152828 A1 | 6/2014 | Plante |
| 2014/0226010 A1 | 8/2014 | Molin |
| 2014/0232863 A1 | 8/2014 | Paliga |
| 2014/0270684 A1 | 9/2014 | Jayaram |
| 2014/0279707 A1 | 9/2014 | Joshua |
| 2014/0280204 A1 | 9/2014 | Avery |
| 2014/0300739 A1 | 10/2014 | Mimar |
| 2014/0309849 A1 | 10/2014 | Ricci |
| 2014/0335902 A1 | 11/2014 | Guba |
| 2014/0336916 A1 | 11/2014 | Yun |
| 2015/0035665 A1 | 2/2015 | Plante |
| 2015/0057836 A1 | 2/2015 | Plante |
| 2015/0105934 A1 | 4/2015 | Palmer |
| 2015/0112542 A1 | 4/2015 | Fuglewicz |
| 2015/0112545 A1 | 4/2015 | Binion |
| 2015/0134226 A1 | 5/2015 | Palmer |
| 2015/0135240 A1 | 5/2015 | Shibuya |
| 2015/0156174 A1 | 6/2015 | Fahey |
| 2015/0170428 A1 | 6/2015 | Harter |
| 2015/0189042 A1 | 7/2015 | Sun |
| 2015/0022449 A1 | 8/2015 | Salinger |
| 2015/0222449 A1 | 8/2015 | Salinger |
| 2015/0317846 A1 | 11/2015 | Plante |
| 2016/0054733 A1 | 2/2016 | Hollida |
| 2019/0176837 A1 | 6/2019 | Williams |
| 2019/0176847 A1 | 6/2019 | Palmer |
| 2019/0180524 A1 | 6/2019 | Palmer |

FOREIGN PATENT DOCUMENTS

| | | |
|---|---|---|
| CA | 2692415 | 8/2011 |
| CA | 2692415 A1 | 8/2011 |
| DE | 20311262 | 9/2003 |
| DE | 102004004669 | 12/2005 |
| EP | 0708427 A2 | 4/1996 |
| EP | 0840270 A2 | 5/1998 |
| EP | 0848270 A2 | 5/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2320387 | 5/2011 |
| EP | 2407943 | 1/2012 |
| GB | 2268608 A | 1/1994 |
| GB | 2402530 | 12/2004 |
| GB | 2402530 A | 12/2004 |
| GB | 2451485 | 2/2009 |
| GB | 2447184 B | 6/2011 |
| GB | 2446994 | 8/2011 |
| JP | 58085110 | 5/1983 |
| JP | 62091092 | 4/1987 |
| JP | 02056197 | 2/1990 |
| JP | 5294188 | 11/1993 |
| JP | 10076880 | 3/1998 |
| KR | 1000588169 | 12/2000 |
| KR | 20000074416 | 12/2000 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0028410 A1 | 5/2000 |
| WO | 0048033 | 8/2000 |
| WO | 0077620 | 12/2000 |
| WO | 0123214 | 4/2001 |
| WO | 0125054 | 4/2001 |
| WO | 0146710 A2 | 6/2001 |
| WO | 03045514 | 6/2003 |
| WO | 2004066275 | 8/2004 |
| WO | 2006022824 | 3/2006 |
| WO | 2006022824 A2 | 3/2006 |
| WO | 2007067767 | 6/2007 |
| WO | 2007109091 | 9/2007 |
| WO | 2009081234 | 7/2009 |
| WO | 2011055743 A1 | 5/2011 |
| WO | 2013072939 | 5/2013 |
| WO | 2013159853 | 10/2013 |

OTHER PUBLICATIONS

USPTO Non-Final Office Action dated Jan. 4, 2016 in U.S. Appl. No. 14/529,134, filed Oct. 30, 2014 (65 pgs).
PCT International Search Report and Written Opinion for PCT/US15/60721 dated Feb. 26, 2016, 11 pages.
Notice of Allowance for U.S. Appl. No. 13/957,810, dated Jun. 8, 2015, 10 pages.
Trivinci Systems, LLC, "Race-Keeper System User Guide", V1 .1.02, Jan. 2011, p. 21.
USPTO Non-Final Office Action dated Nov. 27, 2013 in U.S. Appl. No. 13/957,810, filed Aug. 2, 2013.
Adaptec published and sold its VideoOh! DVD software USB 2.0 Edition in at least Jan. 24, 2003.
Ambulance Companies Use Video Technology to Improve Driving Behavior, Ambulance Industry Journal, Spring 2003.
Amended Complaint for Patent Infringement, Trade Secret Misappropriation, Unfair Competition and Conversion in *DriveCam, Inc.* v. *SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424.
Answer to Amended Complaint; Counterclaims; and Demand for Jury Trial in *DriveCam, Inc.* v. *SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History.
U.S. Appl. No. 11/297,669, filed Dec. 8, 2005, File History.
U.S. Appl. No. 11/297,889, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/593,882, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Bill, 'DriveCam—FAQ', Dec. 12, 2003.

(56) References Cited

OTHER PUBLICATIONS

Bill Siuru, 'DriveCam Could Save You Big Bucks', Land Line Magazine, May-Jun. 2000.
Chris Woodyard, 'Shuttles save with DriveCam', Dec. 9, 2003.
Dan Carr, Flash Video Template: Video Presentation with Navigation, Jan. 16, 2006, http://www.adobe.com/devnet/fiash/articles/vidtemplate_mediapreso_flash8.html.
David Cullen, 'Getting a real eyeful', Fleet Owner Magazine, Feb. 2002.
David Maher, 'DriveCam Brochure Folder', Jun. 6, 2005.
David Maher, "DriveCam Brochure Folder", Jun. 8, 2005.
David Vogeleer et al., Macromedia Flash Professional 8UNLEASHED (Sams Oct. 12, 2005).
Del Lisk, 'DriveCam Training Handout Ver4', Feb. 3, 2005.
Drivecam, Inc., User's Manual for Drivecam Video Systems' Hindsight 20/20 Software Version 4.0 (2003).
DriveCam, Inc.'s Infringement Contentions Exhibit A, U.S. Pat. No. 6,389,340, Document 34.1, Oct. 20, 2011.
DriveCam, Inc.'s Infringement Contentions Exhibit B, U.S. Pat. No. 7,659,827. Aug. 19, 2011.
DriveCam, Inc.'s Infringement Contentions Exhibit B, U.S. Pat. No. 7,804,426, Document 34.2, Oct. 20, 2011.
DriveCam, Inc.'s Infringement Contentions Exhibit C, U.S. Pat. No. 7,659,827, Document 34.3, Oct. 20, 2011.
DriveCam, Inc.'s Infringement Contentions Exhibit C, U.S. Pat. No. 7,804,426. Aug. 19, 2011.
DriveCam, Inc.'s Infringement Contentions Exhibit D, Document 34.4, Oct. 20, 2011.
DriveCam—Illuminator Data Sheet, Oct. 2, 2004.
Drivecam.com as retrieved by the Internet Wayback Machine as of Mar. 5, 2005.
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011.
DriveCam Driving Feedback System, Mar. 15, 2004.
DriveCam Extrinsic Evidence with Patent LR 4.1 .a Disclosures, Nov. 3, 2011.
DriveCam Extrinsic Evidence with Patent LR 4.1 .a Disclosures, Nov. 8, 2011.
Driver Feedback System, Jun. 12, 2001.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.

Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
GE published its VCR User's Guide for Model VG4255 in 1995.
Glenn Oster, 'Hindsight 20/20 v4.0 Software Installation', 1 of 2, Jun. 20, 2003.
Glenn Oster, 'HindSight 20/20 v4.0 Software Installation', 2 of 2, Jun. 20, 2003.
Glenn Oster, 'Illuminator Installation', Oct. 3, 2004.
Hans Fantel, Video; Search Methods Make a Difference in Picking VCR's, NY Times, Aug. 13, 1989.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Categorys-ub.--Code=coaching)., printed from site on Jan. 11, 2012.
Interior Camera Data Sheet, Oct. 26, 2001.
International Search Report and Written Opinion issued in PCT/US07/68325 dated Feb. 27, 2008.
International Search Report and Written Opinion issued in PCT/US07/68328 dated Oct. 15, 2007.
International Search Report and Written Opinion issued in PCT/US07/68329 dated Mar. 3, 2008.
International Search Report and Written Opinion issued in PCT/US07/68332 dated Mar. 3, 2008.
International Search Report and Written Opinion issued in PCT/US07/68334 dated Mar. 5, 2008.
International Search Report for PCT/US2006/47055, dated Mar. 20, 2008 (2 pages).
International Search Report issued in PCT/US2006/47042 dated Feb. 25, 2008.
J. Gallagher, 'Lancer Recommends Tech Tool', Insurance and Technology Magazine, Feb. 2002.
Jean (DriveCam vendor), 'DC Data Sheet', Nov. 6, 2002.
Jean (DriveCam vendor), 'DriveCam brochure', Nov. 6, 2002.
Jean (DriveCam vendor), 'Feedback Data Sheet', Nov. 6, 2002.
Jean (DriveCam vendor), 'Hindsight 20-20 Data Sheet', Nov. 4, 2002.
Jessyca Wallace, 'Analyzing and Processing DriveCam Recorded Events', Oct. 6, 2003.
Jessyca Wallace, 'Overview of the DriveCam Program', Dec. 15, 2005.
Jessyca Wallace, 'The DriveCam Driver Feedback System', Apr. 6, 2004.
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc. v. SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.
Joint Claim Construction Worksheet in *DriveCam, Inc. v. SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc. v. SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004.
Julie Stevens, 'Program Support Roll-Out & Monitoring', Jul. 13, 2004.
Jung, Sang-Hack, et al., Egomotion Estimation in Monocular Infrared Image Sequence for Night Vision Applications, IEEE Workshop on Applications of Computer Vision (WACV '07), Feb. 2007, pp. 8-8; Digital Object Identifier 10.1109/WACV.2007.20.

(56) References Cited

OTHER PUBLICATIONS

JVC Company of America, JVC Video Cassette Recorder HR-IP820U Instructions (1996).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002.
Karen, 'Managers Guide to the DriveCam Driving Feedback System', Jul. 30, 2002.
Kathy Latus (Latus Design), 'Case Study—Cloud 9 Shuttle', Sep. 23, 2005.
Kathy Latus (Latus Design), 'Case Study—Lloyd Pest Control', Jul. 19, 2005.
Kathy Latus (Latus Design), 'Case Study—Time Warner Cable', Sep. 23, 2005.
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SFRA.2006.8.
Kitchin, Charles. "Understanding accelerometer scale factor and offset adjustments." Analog Devices (1995).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa Mckenna, 'A Fly on the Windshield?', Pest Control Technology Magazine, Apr. 2003.
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Panasonic Corporation, Video Cassette Recorder (VCR) Operating Instructions for Models No. PV-V4020/PV-V4520.
Passenger Transportation Mode Brochure, May 2, 2005.
Patent Abstracts of Japan vol. 007, No. 180 (P-215), Aug. 9, 1983 (Aug. 9, 1983) & JP 58 085110 A (Mitsuhisa Ichikawa), May 21, 1983 (May 21, 1983).
Patent Abstracts of Japan vol. 011, No. 292 (E-543), Sep. 19, 1987 (Sep. 19, 1987) & JP 62 091092 A (OK Eng:KK), Apr. 25, 1987 (Apr. 25, 1987).
Patent Abstracts of Japan vol. 012, No. 001 (M-656), Jan. 6, 1988 (Jan. 6, 1988) & JP 62 166135 A (Fuji Electric Co Ltd), Jul. 22, 1987 (Jul. 22, 1987).
Patent Abstracts of Japan vol. 014, No. 222 (E-0926), May 10, 1990 (May 10, 1990) & JP 02 056197 A (Sanyo Electric Co Ltd), Feb. 26, 1990 (Feb. 26, 1990).
Patent Abstracts of Japan vol. 017, No. 039 (E-1311), Jan. 25, 1993 (Jan. 25, 1993) & JP 04 257189 A (Sony Corp), Sep. 11, 1992 (Sep. 11, 1992).
Patent Abstracts of Japan vol. 017, No. 521 (E-1435), Sep. 20, 1993 (Sep. 20, 1993) & JP 05 137144 A (Kyocera Corp), Jun. 1, 1993 (Jun. 1, 1993).
Patent Abstracts of Japan vol. 1996, No. 09, Sep. 30, 1996 (Sep. 30, 1996) & JP 08 124069 A (Toyota Motor Corp), May 17, 1996 (May 17, 1996).
Patent Abstracts of Japan vol. 1997, No. 10, Oct. 31, 1997 (Oct. 31, 1997) & JP 09 163357 A (Nippon Soken Inc), Jun. 20, 1997 (Jun. 20, 1997).
Patent Abstracts of Japan vol. 1998, No. 02, Jan. 30, 1998 (Jan. 30, 1998) & JP 09 272399 A (Nippon Soken Inc), Oct. 21, 1997 (Oct. 21, 1997).
Patent Abstracts of Japan vol. 1998, No. 8, Jun. 30, 1998 (Jun. 30, 1998) & JP 10 076880 A (Muakami Corp), Mar. 24, 1998 (Mar. 24, 1998).
PCT/US2010/022012, Invitation to Pay Additional Fees with Communication of Partial International Search, dated Jul. 21, 2010.
Peter G. Thurlow, Letter (including exhibits) Regarding Patent Owner's Response to Initial Office Action in Ex Parte Reexamination, dated Mar. 27, 2012.
Preliminary Claim Construction and Identification of Extrinsic Evidence of Defendant/Counterclaimant SmartDriveSystems, Inc.' in *DriveCam, Inc.* v. *SmartDrive Systems, Inc.*, Case No. 3:11-CV-00997-H (RBB), for the Southern District of California. Nov. 8, 2011.
Quinn Maughan, 'DriveCam Enterprise Services', Jan. 5, 2006.
Quinn Maughan, 'DriveCam Managed Services', Jan. 5, 2006.
Quinn Maughan, 'DriveCam Standard Edition', Jan. 5, 2006.
Quinn Maughan, 'DriveCam Unit Installation', Jul. 21, 2005.
Quinn Maughan, 'Enterprise Services', Apr. 17, 2006.
Quinn Maughan, 'Enterprise Services', Apr. 7, 2006.
Quinn Maughan, 'Hindsight Installation Guide', Sep. 29, 2005.
Quinn Maughan, 'Hindsight Users Guide', Jun. 7, 2005.
Ronnie Rittenberry, 'Eyes on the Road', Jul. 2004.
SmartDrives Systems, Inc's Production, SO14246-S014255, Nov. 16, 2011.
Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011.
The DriveCam, Nov. 6, 2002.
The DriveCam, Nov. 8, 2002.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012.
U.S. Appl. No. 12/691,639, entitled 'Driver Risk Assessment System and Method Employing Selectively Automatic Event Scoring', filed Jan. 21, 2010.
U.S. Appl. No. 11/377,167, Final Office Action dated Nov. 8, 2013.
U.S. Appl. No. 11/377,157, filed Mar. 16, 2006 entitled, "Vehicle Event Recorder Systems and Networks Having Parallel Communications Links".
U.S. Appl. No. 11/377,167, filed Mar. 16, 2006 entitled, "Vehicle Event Recorder Systems and Networks Having Integrated Cellular Wireless Communications Systems".
USPTO Final Office Action for U.S. Appl. No. 11/297,669, dated Nov. 7, 2011, 15 pages.
USPTO Final Office Action for U.S. Appl. No. 13/957,810, dated Jun. 27, 2014, 24 pages.
USPTO Non-Final Office Action for U.S. Appl. No. 11/296,906, dated Apr. 2, 2009, 7 pages.
USPTO Non-Final Office Action for U.S. Appl. No. 11/296,906, dated Nov. 6, 2009, 9 pages.
USPTO Non-Final Office Action for U.S. Appl. No. 11/297,669, dated Apr. 28, 2011, 11 pages.
USPTO Non-Final Office Action for U.S. Appl. No. 11/299,028, dated Apr. 24, 2008, 9 pages.
USPTO Non-Final Office Action for U.S. Appl. No. 11/377,164, dated Nov. 19, 2007, 7 pages.
USPTO Non-Final Office Action for U.S. Appl. No. 11/377,164, dated Nov. 25, 2011, 9 pages.
USPTO Non-Final Office Action for U.S. Appl. No. 11/377,164, dated Sep. 11, 2008, 8 pages.
USPTO Non-Final Office Action for U.S. Appl. No. 11/377,167, dated Jun. 5, 2008, 11 pages.
USPTO Non-Final Office Action for U.S. Appl. No. 11/800,876, dated Dec. 1, 2010, 12 pages.
USPTO Non-Final Office Action for U.S. Appl. No. 11/800,876, dated Dec. 20, 2011, 8 pages.
USPTO Non-Final Office Action for U.S. Appl. No. 12/096,591, dated May 20, 2014, 19 pages.
USPTO Non-Final Office Action for U.S. Appl. No. 11/296,907, dated Mar. 22, 2007 ( 17 pages).

(56) References Cited

OTHER PUBLICATIONS

USPTO Non-final Office Action dated Aug. 27, 2009 during prosecution of U.S. Appl. No. 11/566,424.
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011.
Written Opinion issued in PCT/US07/68328 dated Oct. 15, 2007.
Written Opinion of the International Searching Authority for PCT/US2006/47042, dated Feb. 25, 2008 (5 pages).
Written Opinion of the International Searching Authority for PCT/US2006/47055, dated Mar. 20, 2008 (5 pages).
Inovate Motorsports, OT-1 16 Channel OBD-II Interface User Manual, Version 1.0, Nov. 28, 2007, pp. 3, 4, 21 & 27.
Trivinci Systems, LLC, Race-Keeper Systems User Guide, Jan. 2011, v1, 1.02, pp. 34 and 39.
USPTO Non-Final Office Action for U.S. Appl. No. 14/036,299, dated Aug. 12, 2014.
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit C, U.S. Pat. No. 7,804,426. Aug. 19, 2011. (47 pgs.).
DriveCam's Disclosure of Asserted Claims and Preliminary Infringement Contentions in *DriveCam, Inc.* v. *SmartDrive Systems, Inc.*, Case No. 3:11-CV-00997-H-RBB, for the Southern District of California. Aug. 19, 2011. (6 pgs.).
Preliminary Claim Construction and Identification of Extrinsic Evidence of Defendant/Counterclaimant SmartDriveSystems, Inc.' in *DriveCam, Inc.* v. *SmartDrive Systems, Inc.*, Case No. 3:11-CV-00997-H (RBB), for the Southern District of California. Nov. 8, 2011. (13 pgs.).
Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011. (7 pgs.).
Edwin Olson, A Passive Solution to the Sensor Synchronization Problem, the 2010 IEEE/RSJ International Conference on Intelligent Robots and Systems, Oct. 18-22, 2010, 6 pages.
"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011.
"DriveCam Driving Feedback System", DriveCam brochure, Jun. 12, 2001, Document #6600128.
"DriveCam Driving Feedback System" DriveCam brochure, Mar. 15, 2004.
"DriveCam Passenger Transportation Module", DriveCam brochure, Oct. 26, 2001.
"DriveCam Video Event Data Recorder", DriveCam brochure, Nov. 6, 2002, Document #6600127.
"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011.
"Sonic MyDVD 4.0: Tutorial: Trimming video segments". Tutorial for software bundled with Adaptec VideoOh! DVD USB 2.0 Edition, 2003.
"User's Manual for DriveCam Video Systems' HindSight 20/20 Software Version 4.0" DriveCam Manual, San Diego, 2003, Document #6600141-1.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005.
Del Lisk, "DriveCam Training Seminar" Handout, 2004.
European Examination Report issued in EP 07772812.9 dated Jan. 22, 2015; 5 pages.
Jean (DriveCam vendor) "DriveCam Driving Feedback System", DriveCam brochure, Nov. 6, 2002, Document #6600128-1.
Notice of Allowance Allowance for U.S. Appl. No. 14/036,299, dated Mar. 20, 2015, xx pages.
Notice of Allowance Application for U.S. Appl. No. 11/566,424, dated Feb. 26, 2010, 6 pages.
Notice of Allowance for U.S. Appl. No. 11/377,164, dated Dec. 3, 2014, 5 pages.
Notice of Allowance for U.S. Appl. No. 11/377,164, dated Feb. 13, 2015, 2 pages.
Notice of Allowance for U.S. Appl. No. 11/377,164, dated Feb. 25, 2014, 2 pages.
Notice of Allowance for U.S. Appl. No. 11/377,164, dated Nov. 18, 2013, 7 pages.
Notice of Allowance for U.S. Appl. No. 11/377,167, dated Apr. 1, 2015, 7 pages.
Notice of Allowance for U.S. Appl. No. 11/800,876, dated Apr. 19, 2012, 8 pages.
USPTO Final Office Action for U.S. Appl. No. 11/296,906, dated Aug. 8, 2012, 15 pages.
USPTO Final Office Action for U.S. Appl. No. 12/096,591, dated Dec. 5, 2014, 23 pages.
USPTO Final Office Action for U.S. Appl. No. 12/096,591, dated Jul. 18, 2012, 15 pages.
USPTO Final Office Action for U.S. Appl. No. 12/096,591, dated Nov. 7, 2013, 14 pages.
USPTO Final Office Action for U.S. Appl. No. 13/957,810, dated Jun. 27, 2014, 22 pages.
USPTO Final Office Action for U.S. Appl. No. 14/036,299, dated Feb. 24, 2015, 9 pages.
USPTO Non-Final Office Action for U.S. Appl. No. 11/296,906, dated Apr. 8, 2014, 19 pages.
USPTO Non-Final Office Action for U.S. Appl. No. 11/296,906, dated Jun. 12, 2012, 13 pages.
USPTO Non-Final Office Action for U.S. Appl. No. 11/377,164, dated Apr. 7, 2014, 7 pages.
USPTO Non-Final Office Action for U.S. Appl. No. 11/377,164, dated Aug. 18, 2014, 5 pages.
USPTO Non-Final Office Action for U.S. Appl. No. 11/377,164, dated Sep. 10, 2012, 10 pages.
USPTO Non-Final Office Action for U.S. Appl. No. 11/377,167, dated Jun. 27, 2013, 11 pages.
USPTO Non-Final Office Action for U.S. Appl. No. 12/096,591, dated Jun. 14, 2011, 8 pages.
USPTO Non-Final Office Action for U.S. Appl. No. 12/096,591, dated Mar. 27, 2013, 16 pages.
USPTO Non-Final Office Action for U.S. Appl. No. 13/957,810, dated Apr. 17, 2015, 6 pages.
USPTO Non-final Office Action for U.S. Appl. No. 13/957,810, dated Nov. 27, 2013, 18 pages.
History of the web browser, Wikipedia (Year: 2019) (8 pages).
Olson, E, A passive solution to the sensor synchronization problem, Intelligent Robots and Systems (IROS), Technical Fields 2010 IEEE/RSJ International Conference on, IEEE, Piscataway, NJ, USA, Searched (IPC) Oct. 18, 2010 (Oct. 18, 2010), pp. 1059-1064, XP031920438, DOI: 10.1109/IROS.2010.5650579 ISBN: 978-1-4244-6674-0.
Gary A. Rayner, U.S. Appl. No. 09/020,700, filed Feb. 9, 1998.
Gary A. Rayner, U.S. Appl. No. 09/405,857, filed Sep. 24, 1999.
Gary A. Rayner, U.S. Appl. No. 09/611,891, filed Jul. 7, 2000.
Gary A. Rayner, U.S. Appl. No. 09/669,449, filed Sep. 25, 2000.
Gary A. Rayner, U.S. Appl. No. 09/732,813, filed Dec. 11, 2000.
Charlie Gunderson, U.S. Appl. No. 11/382,222, filed May 8, 2006.
Charlie Gunderson, U.S. Appl. No. 11/382,239, filed May 9, 2006.
Charlie Gunderson, U.S. Appl. No. 11/382,325, filed May 9, 2006.
Charlie Gunderson, U.S. Appl. No. 11/382,328, filed May 9, 2006.

(56) References Cited

OTHER PUBLICATIONS

David Stanley, U.S. Appl. No. 11/465,765, filed Aug. 18, 2006.
Larry Richardson, U.S. Appl. No. 11/467,486, filed Aug. 25, 2006.
Craig Denson, U.S. Appl. No. 11/467,694, filed Aug. 28, 2006.
Carl Miller, U.S. Appl. No. 11/566,526, filed Dec. 4, 2006.
Jamie Etcheson, U.S. Appl. No. 11/566,424, filed Dec. 4, 2006.
Jamie Etcheson, U.S. Appl. No. 11/566,539, filed Dec. 4, 2006.
Bryan Cook, U.S. Appl. No. 12/359,787, filed Jan. 26, 2009.
Bryan Cook, U.S. Appl. No. 12/691,639, filed Jan. 21, 2010.
Bryan Cook, U.S. Appl. No. 12/793,362, filed Jun. 3, 2010.
Bryan Cook, U.S. Appl. No. 12/814,117, filed Jun. 11, 2010.
Charlie Gunderson, U.S. Appl. No. 13/234,103, filed Sep. 15, 2011.
Syrus C. Nemat-Nasser, U.S. Appl. No. 13/235,263, filed Sep. 16, 2011.
Roni Tamari, U.S. Appl. No. 13/271,417, filed Oct. 12, 2011.
Bryan Cook, U.S. Appl. No. 13/586,750, filed Aug. 15, 2012.
Craig Denson, U.S. Appl. No. 13/736,709, filed Jan. 8, 2013.
Bryan Cook, U.S. Appl. No. 13/923,130, filed Jun. 20, 2013.
DriveCam, Inc., U.S. Appl. No. 13/914,339, filed Jun. 10, 2013.
DriveCam, Inc., U.S. Appl. No. 14/027,038, filed Sep. 13, 2013.
Larry Richardson, U.S. Appl. No. 13/448,725, filed Apr. 17, 2012.
DriveCam, Inc., U.S. Appl. No. 14/034,296, filed Sep. 23, 2013.
Joshua Donald Botnen, U.S. Appl. No. 13/222,301, filed Aug. 31, 2011.
DriveCam, Inc., U.S. Appl. No. 14/070,206, filed Nov. 1, 2013.
DriveCam, Inc., U.S. Appl. No. 90/011,951, filed Oct. 11, 2011.
DriveCam, Inc., U.S. Appl. No. 95/001,779, filed Oct. 11, 2011.
James Plante, U.S. Appl. No. 11/296,906, filed Dec. 8, 2005.
SmartDrive Systems, Inc., WO2006US47042, Jun. 14, 2007.
James Plante, U.S. Appl. No. 12/096,591, filed Oct. 3, 2008.
SmartDrive Systems, Inc., CA2632689, Dec. 8, 2006.
SmartDrive Systems, Inc., EP068475375, Aug. 20, 2008.
James Plante, U.S. Appl. No. 11/296,907, filed Dec. 8, 2005.
James Plante, U.S. Appl. No. 11/595,015, filed Nov. 9, 2006.
SmartDrive Systems, Inc., WO2006US47055, Jun. 14, 2007.
James Plante, U.S. Appl. No. 12/096,592, filed Oct. 3, 2008.
James Plante, U.S. Appl. No. 13/734,800, filed Jan. 4, 2013.
SmartDrive Systems, Inc., CA2632738, Dec. 7, 2006.
SmartDrive Systems, Inc., GB2632738, Dec. 7, 2006.
James Plante, U.S. Appl. No. 11/297,669, filed Dec. 8, 2005.
SmartDrive Systems, Inc., WO2006US47029, Jun. 14, 2007.
SmartDrive Systems, Inc., CA2632685, Dec. 7, 2006.
SmartDrive Systems, Inc., GB08113383, Dec. 7, 2006.
James Plante, U.S. Appl. No. 11/377,157, filed Mar. 16, 2006.
SmartDrive Systems, Inc., WO2007US06536, Sep. 27, 2007.
SmartDrive Systems, Inc., AU2007227555, Mar. 14, 2007.
SmartDrive Systems, Inc., CA2645896, Mar. 14, 2007.
SmartDrive Systems, Inc., EP077531838, Dec. 17, 2008.
SmartDrive Systems, Inc., NZ571542, Mar. 14, 2007.
James Plante, U.S. Appl. No. 11/377,164, filed Mar. 16, 2006.
James Plante, WO2007US06404, Oct. 18, 2007.
James Plante, EP077728129, Dec. 17, 2008.
James Plante, U.S. Appl. No. 11/377,167, filed Mar. 16, 2006.
James Plante, WO2007US06265, Sep. 27, 2007.
James Plante, EP077529295, Dec. 17, 2008.
James Plante, U.S. Appl. No. 11/593,659, filed Nov. 7, 2006.
James Plante, WO2007US83997, May 15, 2008.
James Plante, U.S. Appl. No. 13/568,151, filed Aug. 7, 2012.
James Plante, U.S. Appl. No. 13/570,283, filed Aug. 9, 2012.
James Plante, U.S. Appl. No. 11/593,682, filed Nov. 7, 2006.
James Plante, WO2007US83998, May 15, 2008.
James Plante, U.S. Appl. No. 11/637,754, filed Dec. 13, 2006.
James Plante, U.S. Appl. No. 11/800,876, filed May 8, 2007.
James Plante, U.S. Appl. No. 13/539,312, filed Jun. 30, 2012.
James Plante, U.S. Appl. No. 11/298,069, filed Dec. 9, 2005.
James Plante, U.S. Appl. No. 13/957,810, filed Aug. 2, 2013.
James Plante, U.S. Appl. No. 11/299,028, filed Dec. 9, 2005.
Jason Palmer, U.S. Appl. No. 14/076,511, filed Nov. 11, 2013.
Jason Palmer, U.S. Appl. No. 14/055,833, filed Oct. 16, 2013.
Jason Palmer, U.S. Appl. No. 14/186,416, filed Feb. 21, 2014.
James Plante, U.S. Appl. No. 14/036,299, filed Sep. 25, 2013.
James Plante, U.S. Appl. No. 14/177,047, filed Feb. 10, 2014.
SmartDrive Systems, Inc., PCT/US07/084366, Nov. 9, 2007.
DriveCam, Inc., U.S. Appl. No. 95/001,781, filed Oct. 11, 2011.
DriveCam, Inc., U.S. Appl. No. 95/001,802, filed Nov. 3, 2011.
DriveCam, Inc., U.S. Appl. No. 14/162,678.
DriveCam, Inc., PCT/US07/68324, May 7, 2007.
DriveCam, Inc., PCT/US07/68325, Nov. 22, 2007.
DriveCam, Inc., PCT/US07/68328, Nov. 22, 2007.
DriveCam, Inc., PCT/US07/68329, Nov. 22, 2007.
DriveCam, Inc., PCT/US07/68331, Nov. 22, 2007.
DriveCam, Inc., PCT/US07/68332, Nov. 22, 2007.
DriveCam, Inc., PCT/US07/68333, Nov. 22, 2007.
DriveCam, Inc., PCT/US07/68334, Nov. 22, 2007.
DriveCam, Inc., PCT/US07/75397, Feb. 28, 2008.
DriveCam, Inc., PCT/US10/22012, Jul. 29, 2010.
DriveCam, Inc., PCT/US11/22087, Jul. 28, 2011.
DriveCam, Inc., PCT/US12/55060, Apr. 18, 2013.
DriveCam, Inc., PCT/US12/55063, Mar. 21, 2013.
DriveCam, Inc., PCT/US13/36244, Apr. 11, 2013.
DriveCam, Inc., PCT/US99/01810, Aug. 12, 1999.
DriveCam, Inc., PCT/US99/29382, Apr. 5, 2001.
Jason Palmer, U.S. Appl. No. 13/571,416, filed Aug. 10, 2012.
Jason Palmer, U.S. Appl. No. 13/571,445, filed Aug. 10, 2012.

* cited by examiner

SYSTEM AND METHOD FOR DETECTING A VEHICLE EVENT AND GENERATING REVIEW CRITERIA

FIELD

This disclosure relates to a system and method for detecting a vehicle event and generating review criteria that correspond to the vehicle event.

BACKGROUND

Systems configured to record, store, and transmit video, audio, and sensor data associated with a vehicle responsive to an incident involving the vehicle are known. The video from the incident is usually analyzed by a user at a later time after the incident. Vehicle Engine Control Module (ECM) systems are known. Such systems interface with external computers (e.g., at an automobile mechanic) where the data stored by the ECM system is analyzed.

SUMMARY

One aspect of the disclosure relates to system and method for detecting a vehicle event and generating review criteria based on the vehicle event. The system is configured to detect a vehicle event, record information representing the vehicle event, and generate review criteria relevant to the information recorded. Some or all of the system may be installed in the vehicle and/or be otherwise coupled with the vehicle. In some implementations, the system may include multiple video capture devices configured to acquire visual output information representing a vehicle environment, one or more sensors configured to generate output signals conveying vehicle operation information related to the vehicle, and/or other components. The multiple video capture devices may have one or more fields of view. The fields of view may include areas of the vehicle environment from which the multiple video capture devices are configured to acquire visual output information. The fields of view may be associated with a direction (e.g., forward looking, rear looking), a location (on top of a vehicle, on the side of a road), and/or other portions of the vehicle environment. An individual video capture device may have an individual field of view that corresponds to one or more other fields of view from other video capture devices. For example, a first field of view from a front looking video capture device and a second field of view from a video capture device positioned on the side of a road may both capture visual information related to the same vehicle event. In some implementations, the system may detect a vehicle event and record information based on the detection of a vehicle event. In some implementations, the system may determine a vehicle event type and generate review criteria based on the vehicle event type and/or fields of view corresponding to the video capture devices. In some implementations, the system may include one or more of a video capture device, a sensor, a processor, an operator interface, external resources, electronic storage, a remote computing device, a reviewer interface, and/or other components.

The video capture devices may be configured to acquire visual output information representing the vehicle environment. In some implementations, visual output information representing the vehicle environment may be acquired from system-integrated and/or non-system integrated vehicle capture devices installed in the vehicle and/or the vehicle environment. The vehicle environment may include spaces in and around the interior and exterior of the vehicle. In some implementations, video capture devices may include individual cameras, a given one of the individual cameras corresponding to an individual field of view.

The sensors may be configured to generate output signals conveying vehicle operation information related to the operation and/or the context of the vehicle. Vehicle operation information related to the operation of the vehicle may include feedback information from one or more of the mechanical systems of the vehicle, one or more safety systems of the vehicle, one or more non-standard aftermarket sensors installed in the vehicle, and/or other information. In some implementations, at least one of the sensors may be a vehicle system sensor included in an ECM system of the vehicle. Information related to the context of the vehicle may include information related to the vehicle environment in and/or around the vehicle. In some implementations, the output signals conveying the vehicle operation information related to the context of the vehicle may be generated via non-standard aftermarket sensors installed in the vehicle, and/or other sensors. For example, one or more individual sensors may be and/or include a proximity sensor. Based on an analysis of the output signals from this sensor, the system may automatically determine a person, vehicle, object and/ or other objects are in proximity to the vehicle. This example sensor may be one of a plurality of sensors in the system.

One or more processors may be configured to execute one or more computer program components. The computer program components may comprise one or more of a parameter component, a detection component, a classification component, a control component, and/or other components.

The parameter component may be configured to determine one or more vehicle event parameters. The parameter component may determine the vehicle event parameters based on the information conveyed by the output signals from the sensors, visual output information acquired from the video capture devices, information acquired from external resources, and/or other information.

The detection component may be configured to detect the occurrence of the vehicle event. The detection component may be configured to detect the vehicle event in real-time or near real-time. The detection component may be configured to detect the vehicle event based on the information conveyed by the output signals generated by the sensors, the visual output information acquired by the video capture devices, information from external resources, information determined by the parameter component, and/or based on other information. For example, the vehicle event may be detected based on a comparison of the determined vehicle event parameters to predetermined vehicle event criteria.

The classification component may be configured to determine a vehicle event type for individual vehicle events. A vehicle event may have one or more vehicle event types. The classification component may determine the vehicle event type in response to the detection of the vehicle event by the vehicle detection component. In some implementations, the vehicle event type may be determined based on pre-set criteria which may be customizable for the system.

The control component may be configured to generate review criteria that correspond to the vehicle event. The review criteria may be generated based on the determined vehicle event type and the fields of view corresponding to the video capture devices. In some implementations, the control component will generate review criteria that correspond to specific fields of view and specific vehicle event types. The review criteria may be generated for a manual reviewer, for example.

The control component may be configured to facilitate wireless communication of information conveyed by the output signals, the visual output information, information related to a detected vehicle event, and/or other information to the remote computing device and/or other devices. The control component may be configured to facilitate communication responsive to the detection of the vehicle event. The control component may be configured to facilitate communication in real-time or near real-time. The control component may be configured to facilitate wireless communication of the information conveyed by the output signals, the visual output information, information related to the detected vehicle event, and/or other information from a period of time that includes at least the vehicle event.

In some implementations, the control component may be configured to facilitate recording of the vehicle event data based on detection of the vehicle event. Vehicle event data may include video, audio, ECM, metadata, GPS, and/or other sensor data for a period of time that lasts from before a given vehicle event starts until after it ends. The period of time for which data is recorded may be determined based on the timing of the vehicle event, the point in time at which the vehicle event is detected, the type of vehicle event, and/or other information.

In some implementations, the control component may be configured to selectively determine one or more types of data that are recorded based on vehicle event types and fields of view corresponding to the video capture devices. For example, the control component may selectively determine whether to record visual output information from devices having one or more specific fields of view, types of data, and/or other vehicle and/or visual output information. Continuing with the example, if the detected vehicle event involved the opening of a passenger door of the vehicle, the control component may cause a video stream from an interior camera with an interior field of view to be included in the event record for monitoring the loading and unloading of passengers. Whereas the interior field of view may not be needed when recording vehicle situations for other (non-interior) vehicle events.

In some implementations, the control component may be configured to determine how much of the event data (video, audio, sensor, etc.) to record before the vehicle event (e.g., pre-vehicle event duration) and after the vehicle event (e.g. post-vehicle event duration) based on the vehicle event itself and/or other information. This may allow the visual output information and/or vehicle operation information to reflect a relevant and/or desired time frame relative to the vehicle event.

In some implementations, the external resources may include an adaptor for adapting analog visual output information to digital visual output information. This may facilitate adapting visual output information acquired from non-system integrated video capture devices so that it has the same format as visual output information acquired from system cameras, and/or other devices. In some implementations, the adaptor may facilitate adapting one or more of a frame rate, a resolution, a brightness, a saturation, and/or an image correction of visual output information acquired from non-system integrated video capture devices.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
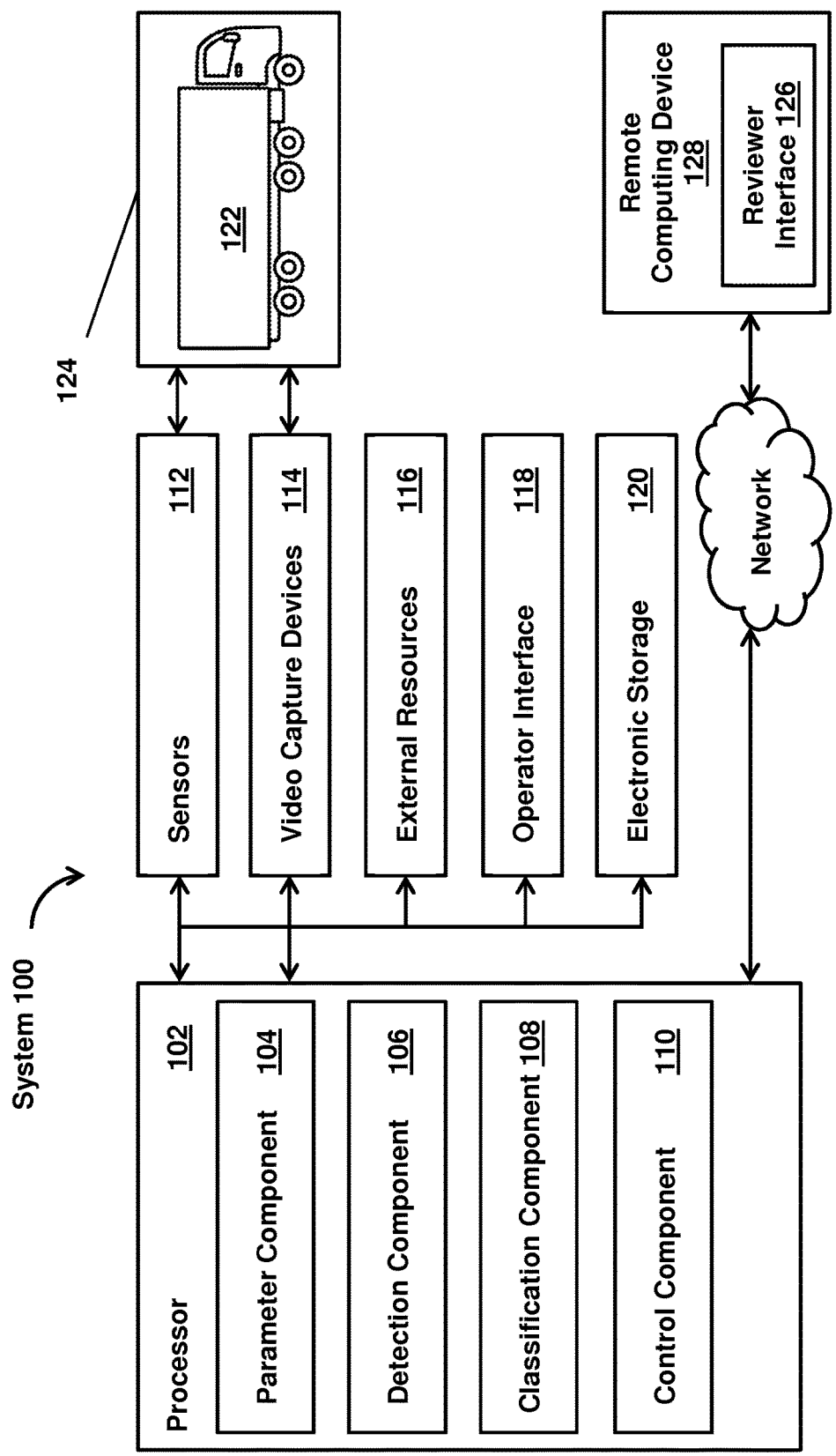
FIG. 1 illustrates a system configured to detect a vehicle event and generate review criteria that correspond to the vehicle event.

FIG. 1 illustrates a system 100 configured to detect a vehicle event and generate review criteria that correspond to the vehicle event. Some or all of system 100 may be installed in a vehicle 122 and/or be otherwise coupled with vehicle 122. System 100 may include multiple video capture devices 114 configured to acquire visual output information representing a vehicle environment 124. The individual video capture devices 114 may have separate corresponding fields of view of vehicle environment 124.

Vehicle environment 124 may include spaces in and/or around an interior and/or an exterior of vehicle 122. System 100 may include one or more sensors 112 configured to generate output signals conveying information related to the vehicle 122. In some implementations system 100 may detect the vehicle event based on the information conveyed by the output signals from sensors 112 and/or other information. System 100 may determine a vehicle event type based on information conveyed by the output signals from sensors 112, visual output information from multiple video capture devices 114, and/or other information. In some implementations, system 100 may generate review criteria that correspond to the vehicle event. The review criteria may be generated based on the vehicle event type and the fields of view corresponding to the video capture devices 114.

Review criteria may prompt a reviewer to review a vehicle event based on the vehicle event type, the fields of view corresponding to the video capture devices, and/or any other information relevant to the vehicle event. Review criteria may include questions, inquiries, prompts, and/or other review criteria related to the vehicle event. The review criteria may guide a reviewer to review relevant aspects of the vehicle event.

System 100 may be configured to monitor vehicles, equipment, drivers, operators, and/or other information to facilitate reduction of risky behaviors, facilitate coaching and/or training, mitigate damage to a vehicle, and/or for other purposes. System 100 may detect and record vehicle events and facilitate review of the vehicle events by a manual reviewer based on the review criteria. In some implementations, system 100 may determine one or more video capture devices 114 with corresponding fields of view relevant to the vehicle event detected. System 100 may generate review criteria for review by a manual reviewer based on these fields of view and/or other information.

In some implementations, system 100 may include one or more of a sensor 112, a video capture device 114, an external resource 116, an operator interface 118, electronic storage 120, a processor 102, a remote computing device 128, and/or other components.

In some implementations, one or more of the components of system 100 may form at least a portion of a vehicle event recorder system such as the vehicle event recorder system described in U.S. patent application Ser. No. 13/957,810 filed Aug. 2, 2013 entitled "Vehicle Event Recorder Systems and Networks Having Integrated Cellular Wireless Communications Systems", which is incorporated herein by reference.

One or more video capture devices 114 may be configured to acquire visual output information representing a vehicle environment (e.g., vehicle environment 124). Video capture devices 114 may include systems for compiling and/or collecting video information, for example, video cameras, digital cameras, analog cameras, still cameras, infrared sensors, and/or other video capture devices 114 that acquire visual output information. In some implementations, video capture devices 114 may include system-integrated video capture devices, non-system integrated video capture devices (e.g., video capture devices included in external resources 116), and/or other video capture devices. Visual output information may include videos, images, clips, broadcasts, pictures, visual data and/or other visual output information representing vehicle environment 124. In some implementations, multiple video capture devices 114 may be positioned in and/or around vehicle 122 and synchronized together to provide a 360 degree view of the inside of vehicle 122 and/or a 360 degree view of the outside of vehicle 122.

In some implementations, video capture devices may be enabled and/or disabled based on user configurability, randomly determined time intervals, the detection of a vehicle event, information from one or more sensors, and or other information. For example, one or more cameras may be enabled and/or disabled based on one or more geo-fences. An individual geo-fence may be a virtual boundary line that defines, represents, and/or is otherwise related to a physical area (e.g., a storage yard where fleet vehicles are stored), a point of interest, a segment of a road/highway/etc., and/or other physical locations. Geo-fences may define areas where a particular action and/or maneuver is allowed. Geo-fences may define areas where particular driving behaviors are disallowed and/or particularly dangerous (e.g., a narrow country road). Specific geo-fences may be associated with specific vehicle events. For example, the payment of roadway tolls may be expected in a geo-fenced area near a tollbooth. In some implementations, geo-fences may be associated with a time of day. For example, a geo-fence may surround a large parking lot at a mall. The geo-fence may apply only during hours that the mall is open, and not, for example, during the early morning or late night hours. In some implementations, one or more cameras may be enabled and/or disabled based on an operator login identification information, dispatch information, and/or other information.

Although video capture devices 114 are depicted in FIG. 1 as a single element, this is not intended to be limiting. Video capture devices 114 may include one or more video capture devices located on the interior of vehicle 122, the exterior of vehicle 122, within vehicle environment 124, and/or in any location that may be in communication with the one or more processors 102 and/or other components of system 100.

Figure 2:
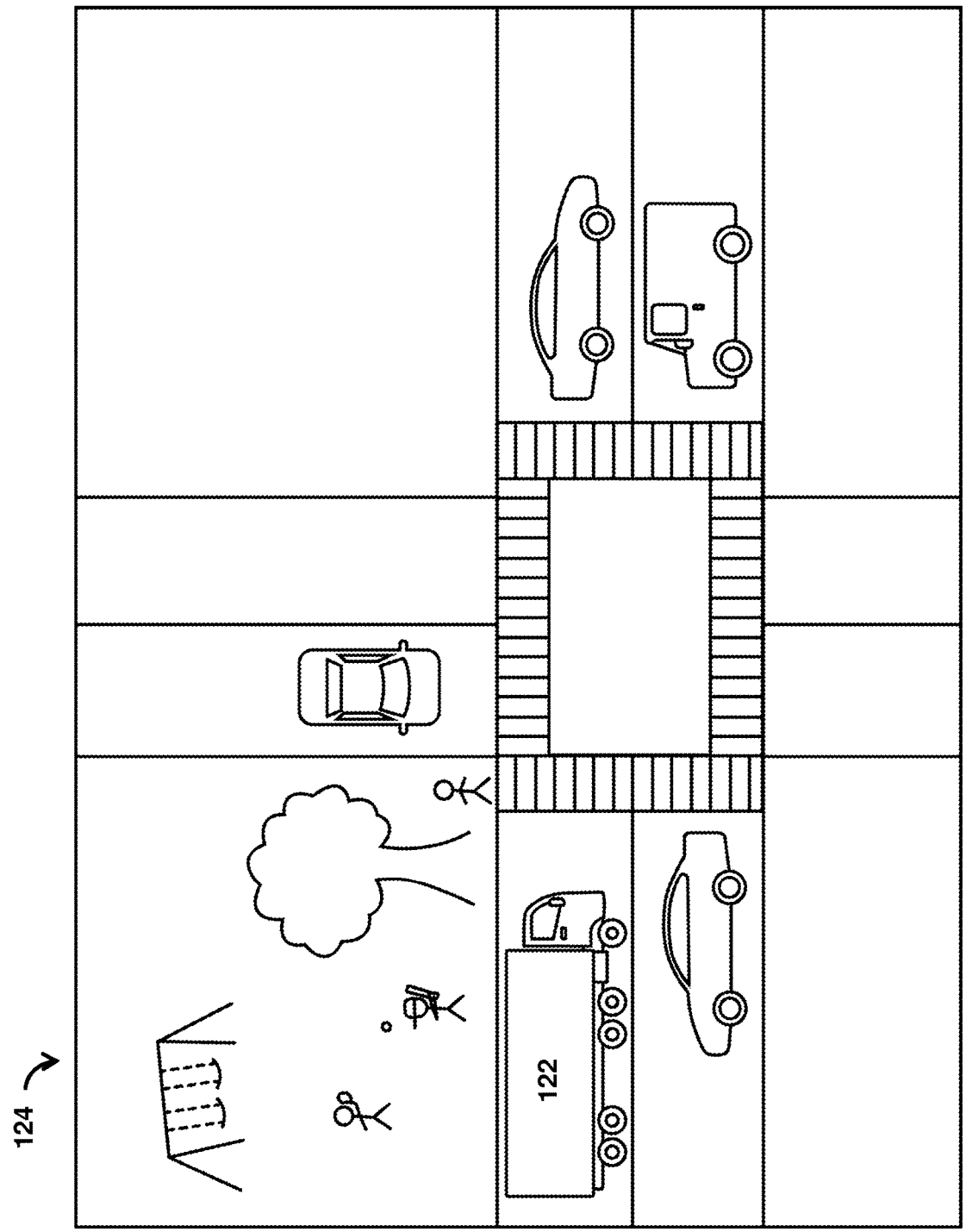
FIG. 2 illustrates a vehicle environment.

Referring to FIGS. 1-2, vehicle environment 124 may include spaces in and around the interior and/or the exterior of vehicle 122. In some implementations, vehicle environment 124 may include spaces in and/or around the interior of vehicle 122, for example, a driver space, passenger space, cargo space and/or other spaces in the interior of vehicle 122. In some implementations, vehicle environment 124 may include the spaces in and/or around the exterior of vehicle 122 such as, for example, forward space in front of vehicle 122, rear space behind vehicle 122, side space on the driver's side of vehicle 122, side space on the passenger's side of vehicle 122, aerial space above vehicle 122, and/or other spaces in or around the exterior of vehicle 122.

Individual ones of the one or more video capture devices 114 may have separate corresponding fields of view of the vehicle environment 124. In some implementations, the separate corresponding fields of view may include, for example, one or more of a forward view, a rear view, a passenger's side view, a driver's side view, a driver view, a cargo view, a left view, a right view, and/or other suitable corresponding fields of view.

One or more sensors 112 may be configured to generate output signals conveying information related to the operation and/or the context of vehicle 122. Information related to the operation of vehicle 122 may include feedback information from one or more of the mechanical systems of vehicle 122, one or more non-standard aftermarket sensors 112 coupled with vehicle 122, and/or other feedback information from other sensors. The mechanical systems of vehicle 122 may include, for example, the engine, the drive train, the lighting systems (e.g., headlights, brake lights), the braking system, the transmission, fuel delivery systems, door/compartment locking systems and/or other mechanical systems. The mechanical systems of vehicle 122 may include one or more mechanical sensors, electronic sensors, and/or other sensors that generate the output signals (e.g., seat belt sensors, tire pressure sensors, etc.).

In some implementations, at least one of sensors 112 may be a vehicle system sensor included in an ECM system of vehicle 122. For example, in some implementations, system 100 may be configured such that a first sensor 112 may be a fuel level sensor which may be associated with an ECM system of vehicle 122. In some implementations, non-standard aftermarket sensors 112 may be coupled with vehicle 122 such that they generate output signals that convey information related to the mechanical systems of vehicle 122. For example, a non-standard aftermarket sensor 112 may be configured to generate output signals that convey information related to braking force. Information related to the context of vehicle 122 may include information related to vehicle 122 relative to the vehicle environment 124. The information related to the context of vehicle 122 may include information related to movement of vehicle 122 (e.g., acceleration, velocity, etc.), an orientation of vehicle 122, a geographic position of vehicle 122, a spatial position of vehicle 122 relative to other objects, a tilt angle of vehicle 122, an inclination/declination angle of vehicle 122, other objects or persons in proximity to vehicle 122, weather conditions surrounding vehicle 122, and/or other information. In some implementations, the output signals conveying the information related to the context of vehicle 122 may be generated via non-standard aftermarket sensors installed in vehicle 122, and/or other sensors. The non-standard aftermarket sensor may include, for example, a video camera (e.g., a video capture device 114), a microphone, an accelerometer, a gyroscope, a geolocation sensor (e.g., a GPS device), a magnetometer, radar (e.g. for measuring distance of leading vehicle), a temperature sensor, a light sensor, and/or other sensors.

Although sensors 112 are depicted in FIG. 1 as a single element, this is not intended to be limiting. Sensors 112 may include one or more sensors located adjacent to and/or in communication with the various mechanical systems of vehicle 122, in one or more positions (e.g., at or near the front of vehicle 122) to accurately acquire information representing the vehicle environment (e.g. visual information, spatial information, orientation information), and/or in other locations. For example, in some implementations, system 100 may be configured such that a first sensor located on top of vehicle 122 is in communication with a geolocation satellite, and a second sensor is located near the operator of vehicle 122 and configured to generate output signals conveying information related to the actions and/or behavior of the operator of vehicle 122. In some implementations, sensors 112 may be configured to generate output signals continuously and/or at intervals during operation of vehicle 122.

Although video capture devices 114 and sensors 112 are depicted in FIG. 1 as separate elements, this is not intended to be limiting. In some implementations, video capture devices 114 may include sensors 112 and/or sensors 112 may include video capture devices 114.

As shown in FIG. 1, processor 102 may be configured to execute one or more computer program components. The computer program components may comprise one or more of a parameter component 104, a detection component 106, a classification component 108, a control component 110, and/or other components.

In some implementations, control component 110 may be configured to associate the visual output information from multiple video capture devices 114, the vehicle operation information conveyed by the output signals of the one or more sensors 112, the vehicle event type, the vehicle event data, the review criteria, and/or the information from any external resources 116, with information related to operation and/or context of the vehicle that corresponds to a given vehicle event into a vehicle event record for that vehicle event.

Parameter component 104 may be configured to determine one or more vehicle event parameters of vehicle 122. Parameter component 104 may determine the vehicle event parameters based on the information conveyed by the output signals from sensors 112, the visual output information acquired by the video capture devices 114, information provided by external systems and/or databases, and/or other information. The one or more vehicle event parameters may be related to the operation of vehicle 122, the context of vehicle 122, vehicle environment 124, and/or other information. For example, the one or more vehicle event parameters may be related to one or more of an acceleration, a direction of travel, a vehicle speed, an engine speed (e.g. RPM), a duration of time, a closing distance, a lane departure from an intended travelling lane of the vehicle, a following distance, the proximity of another car or person to vehicle 122, the opening of a door or compartment of vehicle 122, the arrival of vehicle 122 at a specific destination, and/or other parameters. Vehicle event parameters may have associated predetermined criteria.

Detection component 106 may be configured to detect a vehicle event. Detection of a vehicle event may be based on the information conveyed by the output signals from the one or more sensors 112, the visual output information from the multiple video capture devices 114, parameters determined by parameter component 104, and/or other sources of vehicle operation information. Detection component 106 may detect a vehicle event in real-time, near-real time, and/or other time. In some implementations, vehicle events may have associated predetermined detection criteria. The detection of a vehicle event may be based on one or more determined vehicle event parameters satisfying predetermined criteria. In some implementations, a vehicle event may be detected based on, for example, information, output signals, determined parameters, and/or other information related to one or more of acceleration or deceleration, a direction of travel, a vehicle speed, an engine speed (e.g. RPM), a duration of time, a closing distance, a lane departure, a following distance, another vehicle in close proximity, a person in close proximity, an open door or compartment, a geolocation, a collision, an assault on the operator of vehicle 122, the loading and unloading of cargo from and onto vehicle 122, a passenger incident, property theft, damage to vehicle 122, operator engagement in unsafe or non-compliant activities, fare payments, a video capture device trigger, and/or other vehicle events related to vehicle 122. For example, the detection of a vehicle event such as backing may be based on a video capture device that detects backing presenting and/or capturing visual output information. In some implementations, a vehicle event may include external events not related to vehicle 122. For example, an external event may include an explosion at a job site located within one or more fields of view corresponding to one or more video capture devices of vehicle 122.

In some implementations, detection component 106 may be configured to detect a vehicle event based on output signals from one or more sensors 112 remotely triggered by a user and/or operator. A user and/or operator may remotely trigger one or more of sensors 112 to output information detected by detection component 106 indicating a vehicle event. For example, if a user and/or operator notice something amiss, the user and/or operator may use a remote push bottom to wirelessly trigger one or more sensors to indicate a vehicle event and record visual output information from one or more video capture devices.

By way of a first non-limiting example, detection component 106 may be configured to detect a vehicle event such as the arrival of vehicle 122 at a designated geolocation based on the output signals from a geolocation sensor 112. Detection component 106 may be configured to detect the arrival of vehicle 122 at a designated geolocation in order to monitor a situation such as the payment of fares. Detection component 106 may detect the arrival of vehicle 122 at a designated geolocation based on geolocation parameters determined by parameter component 104 satisfying predetermined geolocation criteria.

By way of a second non-limiting example, detection component 106 may be configured to detect a vehicle event such as a departure from the intended vehicle lane to monitor a potential situation such as a collision.

By way of a third non-limiting example, detection component 106 may be configured to detect a vehicle event such as the opening of a door and/or compartment of vehicle 122 to monitor the loading or unloading of cargo and/or passengers.

By way of a forth non-limiting example, detection component 106 may be configured to detect a vehicle event such as the opening of a cargo compartment and/or motion within a cargo compartment while vehicle 122 is not located at a designated delivery location to monitor a possible situation such as theft.

Classification component 108 may be configured to determine a vehicle event type based on the information conveyed by the output signals from one or more sensors 112, the visual output information from multiple video capture devices 114, information determined by parameter component 104, information determined by detection component 106, information from external resources 116, and/or other information. In some implementations, determining the vehicle event type may include classification of the vehicle event into one or more vehicle event type categories. In some implementations, for example, the vehicle event type may be one or more of a rear vehicle event type, a front vehicle event type, a side vehicle event type, an interior vehicle event type, an exterior vehicle event type, a damage vehicle event type, a fare vehicle event type, a loading/unloading vehicle event type, an operator vehicle event type, and/or other vehicle event types. In some implementations, vehicle event types may be customizable and/or determined by a user. The user may include the operator, reviewer, and/or other users. The user may customize the vehicle event types, for example, a user may determine the vehicle event types include front vehicle events, rear vehicle events, side vehicle events, and/or other vehicle events determined by the user. In some implementations, a vehicle event type may be based on visual output information being available from one or more non-system video capture devices and/or other external resources 116.

Control component 110 may be configured to trigger vehicle event recording (e.g., recording of visual output information and/or other sensor information associated with a vehicle event) based on vehicle event detection. Visual output information and/or sensor information may include video, audio, ECM, metadata, and/or other sensor data for a period of time that lasts from before a given vehicle event starts until after it ends. The period of time for which data is recorded may be determined based on the timing of the vehicle event, the point in time at which the vehicle event is detected, and/or other information. Control component 110 may be configured to trigger recording of substantially all vehicle event data (e.g., video, audio, sensor output signals, etc.), and not just the signals, visual output information, and/or parameters used for vehicle event detection. In some implementations, control component 110 may be configured to trigger recording of visual output information from individual ones of the one or more video capture devices that may have acquired visual output information relevant to the detected vehicle event based on its corresponding field of view and/or the vehicle operation information conveyed by the output signals from sensors 112.

Control component 110 may be configured such that the visual output information and/or vehicle operation information is saved to a non-volatile memory (e.g., included in electronic storage 120) and later offloaded wirelessly via a vehicle event recorder system such as the vehicle event recorder system described in U.S. patent application Ser. No. 11/377,167 filed Mar. 16, 2006 and entitled, "Vehicle Event Recorder Systems And Networks Having Integrated Cellular Wireless Communications Systems" (incorporated by reference above), and/or the vehicle event recorder system described in U.S. patent application Ser. No. 11/377,157 filed Mar. 16, 2006 and entitled, "Vehicle Event Recorder Systems and Networks Having Parallel Communications Links," which is incorporated herein by reference.

Control component 110 may be configured to generate review criteria corresponding to the vehicle event. The generation of review criteria may be responsive to the detection of the vehicle event by detection component 106. Review criteria may be generated based on the vehicle event type, fields of view corresponding to the video capture devices 114, and/or other information. Control component 110 may determine which video capture devices 114 may have acquired visual output information relevant to the detected vehicle event based on their corresponding fields of view. Control component 110 may generate review criteria for the visual output information acquired by these individual video capture devices 114. In some implementations, the review criteria for a first individual field of view corresponding to a first individual video capture device 114 may be different than the review criteria for a second individual field of view corresponding to a second individual video capture device 114.

By way of a first non-limiting example, review criteria generated for a rear field of view may be different than review criteria generated based on a driver field of view.

By way of a second non-limiting example, review criteria generated based on an exterior vehicle event type may be different than review criteria based on an interior vehicle event type.

By way of a third non-limiting example, review criteria generated based on an exterior vehicle event type and the field of view corresponding to a rear video capture device may be different from review criteria generated based on an interior vehicle event type and the field of view corresponding to a rear video capture device, which may be further different from review criteria generated based on an exterior vehicle event type and the field of view corresponding to a front video capture device.

Control component 110 may be configured to facilitate wireless communication of vehicle operation information, the visual output information, the vehicle event detection information, the vehicle event type, the vehicle event data, the review criteria, and/or other information to remote computing device 128 and/or other devices. In some implementations, control component 110 may be configured to facilitate wireless communication of visual output information as a live feed to a wireless handheld device.

Control component 110 may be configured to facilitate communication responsive to the detection of a vehicle event. Control component 110 may be configured to facilitate communication, in real-time, near-real time, and/or other time, of individual visual output information from individual video output devices. The individual visual output information communicated, the timing of the communication, and/or other characteristics of the wireless communication may be based on one or more of the vehicle event type, an intensity, the one or more fields of view available, and/or other information. The one or more fields of view available may be based on the determination of which video capture devices 114 are enabled and/or may have acquired visual output information relevant to the detected vehicle event based on their corresponding fields of view. By way of non-limiting example, visual output information from a video capture device having a rear field of view may be communicated if the vehicle event type is a rear collision.

Control component 110 may be configured to facilitate communication in real-time, near real-time, and/or other time. For example, control component 110 may facilitate one or more individual communications during the operation of vehicle 122. Each individual communication may be responsive to a detected vehicle event and/or may occur just after detection of a vehicle event. In some implementations, control component 110 may be configured to facilitate communication after use of vehicle 110 has ceased such that the vehicle operation information, visual output information, information identifying the vehicle event detected by detection component 106, the vehicle event type, the vehicle event data, the review criteria, and/or other information is communicated in a single communication and/or multiple communications.

Control component 110 may be configured to facilitate storage and/or wireless communication of the vehicle operation information conveyed by the output signals, the visual output information, the information identifying the vehicle event detected by detection component 106, the vehicle event type, the vehicle event data, the review criteria, information from any external resources 116, and/or other information from a period of time that includes at least the vehicle event. For example, control component 110 may facilitate communication and/or storage of the information conveyed by the output signals, the visual output information, and/or other information from a period of time that begins before the beginning of the detected vehicle event, lasts throughout the vehicle event, and ends after the end of the detected vehicle event. Control component 110 may be configured such that the period of time that includes at least the vehicle event is centered around the specific vehicle event and includes a pre-vehicle event time, the vehicle event, and a post-vehicle event time, wherein the pre-vehicle event time and the post vehicle event time are approximately equal. In some implementations, control component 110 may be configured such that the period of time that includes at least the vehicle event begins with the vehicle event and continues for a post-vehicle event period of time.

In some implementations, control component 110 may be configured to determine how much of the vehicle event data (video, audio, sensor, etc.) to record before the vehicle event (e.g., pre-vehicle event duration) and after the vehicle event (e.g. post-vehicle event) based on the vehicle event itself. This may allow the event data to show a relevant and/or desired time frame.

For example, responsive to detection of the opening of a passenger door by detection component 106, control component 110 may be configured to facilitate wireless communication and/or electronic storage of the vehicle operation information conveyed by the output signals, the visual output information, the vehicle event type, the vehicle event data, the review criteria, and/or other information. The communicated and/or stored information may include, for example, video images showing the operator performing the vehicle event, video images before the performance of the vehicle event, video images after the performance of the vehicle event, the vehicle event type, the corresponding fields of view of video capture devices 114, and/or other information.

In some implementations, control component 110 may be configured to facilitate temporary electronic storage of the vehicle information conveyed by the output signals, the visual output information, the vehicle event type, the corresponding fields of view or the video capture devices and/or other information in electronic storage (as described above). Control component 110 may be configured to facilitate temporary electronic storage until the information is communicated to remote computing device 128. Control component 110 may be configured to erase the data temporarily stored in electronic storage 120 responsive to the communication to remote computing device 128.

In some implementations, control component 110 may be configured to cause one or more sensors 112 and/or one or more video capture devices 114 to operate continuously. For example, control component 110 may cause a video camera (e.g., video capture device 114) to continuously generate video images (e.g., visual output information) of vehicle 122, the vehicle environment 124, and/or other vehicle information. Control component 110 may be configured to cause system 100 to continuously buffer visual output information and vehicle operation information which may include, for example, video, audio, sensor, and/or other information. Control component 110 may be configured such that once the vehicle event occurs, the buffered data related to the vehicle event is transferred from a volatile to a non-volatile memory. Control component 110 is configured such that a determination is made in real-time as to whether or not the data related to the vehicle event should be offloaded immediately or kept on the device as backup.

In some implementations, control component 110 may facilitate display of a customizable reviewer interface 126. For example, customizable reviewer interface 126 may facilitate review of the vehicle events by a manual reviewer based on the review criteria. Customizable reviewer interface 126 may include multiple views and may display a portion of the vehicle operation information a portion of the visual output information, and/or other information. The display of the portion of the visual output information may include display of individual ones of the fields of view corresponding to the video capture devices 114. In some implementations, control component 110 may be configured to automatically determine a quantity, the corresponding fields of view, and/or location of visual output information that appears in the customizable reviewer interface. For example, control component 110 may dynamically configure video streams (e.g., visual output information) in groups of two or more. Labeling and/or mapping of visual output information from one or more fields of view may be user configurable.

In some implementations, vehicle operation information and/or visual output information may be routed to one or more given manual reviewers based on a given vehicle event, vehicle event type, information source, information type, and/or other characteristics of the vehicle operation information and/or visual output information. For example, vehicle operation information and/or visual output information corresponding to a rear vehicle event type may be routed to one or more of a set of manual reviewers trained to analyze and/or review vehicle events of the rear vehicle event type. In some implementations, review of vehicle operation information and/or visual output information may be prioritized based on a portion of the vehicle operation information, a portion of the visual output information, a vehicle event type, and/or other characteristics of the vehicle event and/or information.

In some implementations, control component 110 may be configured to synchronize visual output information from one or more video output devices (e.g., synchronize multiple sets of video streams together). For example, visual output information may be synchronized via a field programmable gate arrays located in one or more of video capture devices 114, external resources 116, and/or other locations.

Figure 3:
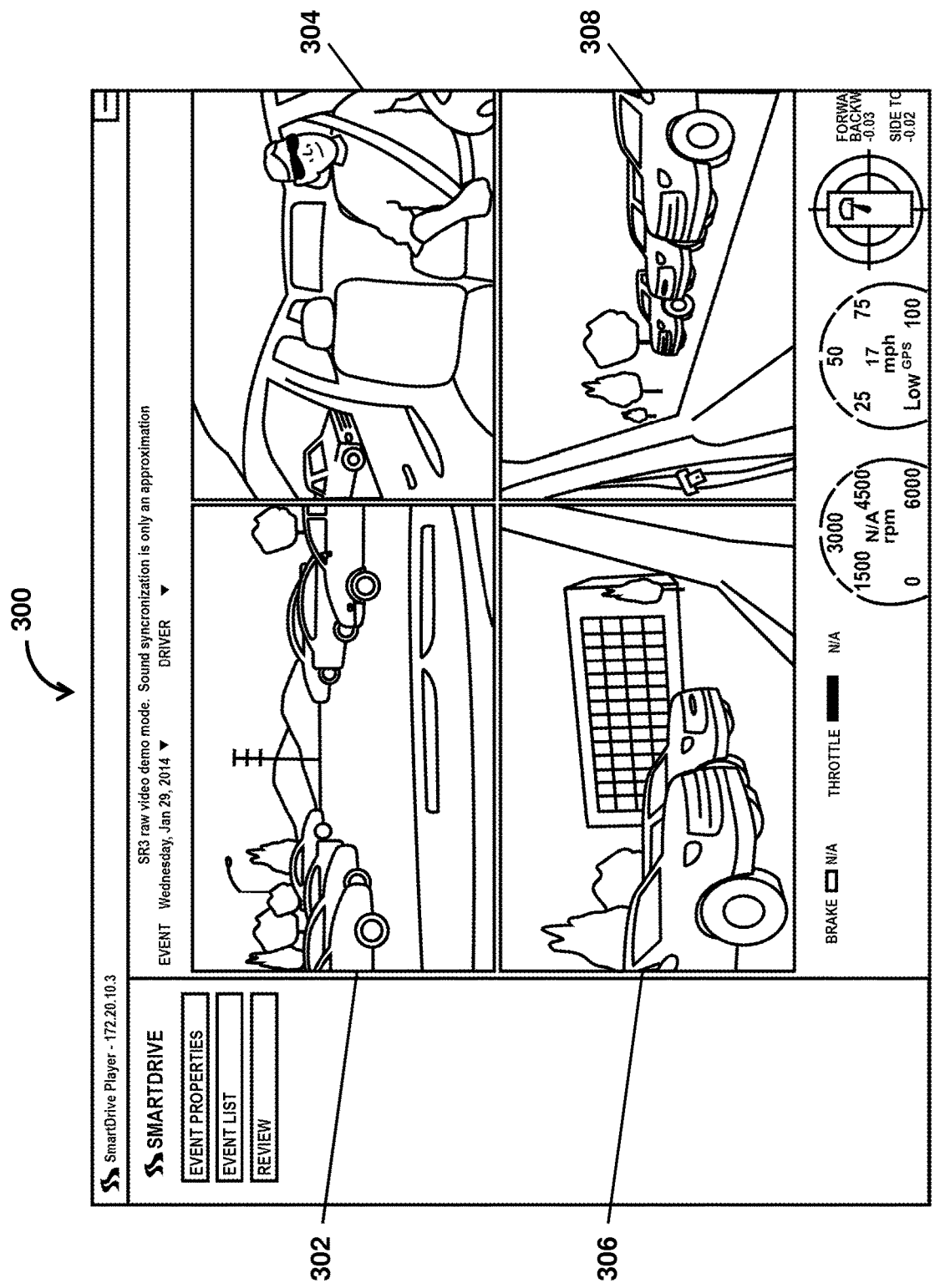
FIG. 3 illustrates a view of a reviewer interface.

Referring to FIG. 3, in some implementations, customizable reviewer interface 126 may include a view 300. View 300 may have one or more fields including fields 302, 304, 306, and 308 which may display the visual output information from individual ones of the fields of view corresponding to the video capture devices 114. In some implementations, the manual reviewer can choose to display a specific field of view corresponding to a specific video capture device in each of fields 302, 304, 306, and 308. In some implementations, view 300 may have one or more fields which may display review criteria for the visual output information displayed in any one or more of fields 302, 304, 306, or 308, based on the individual ones of the fields of view.

Figure 4:
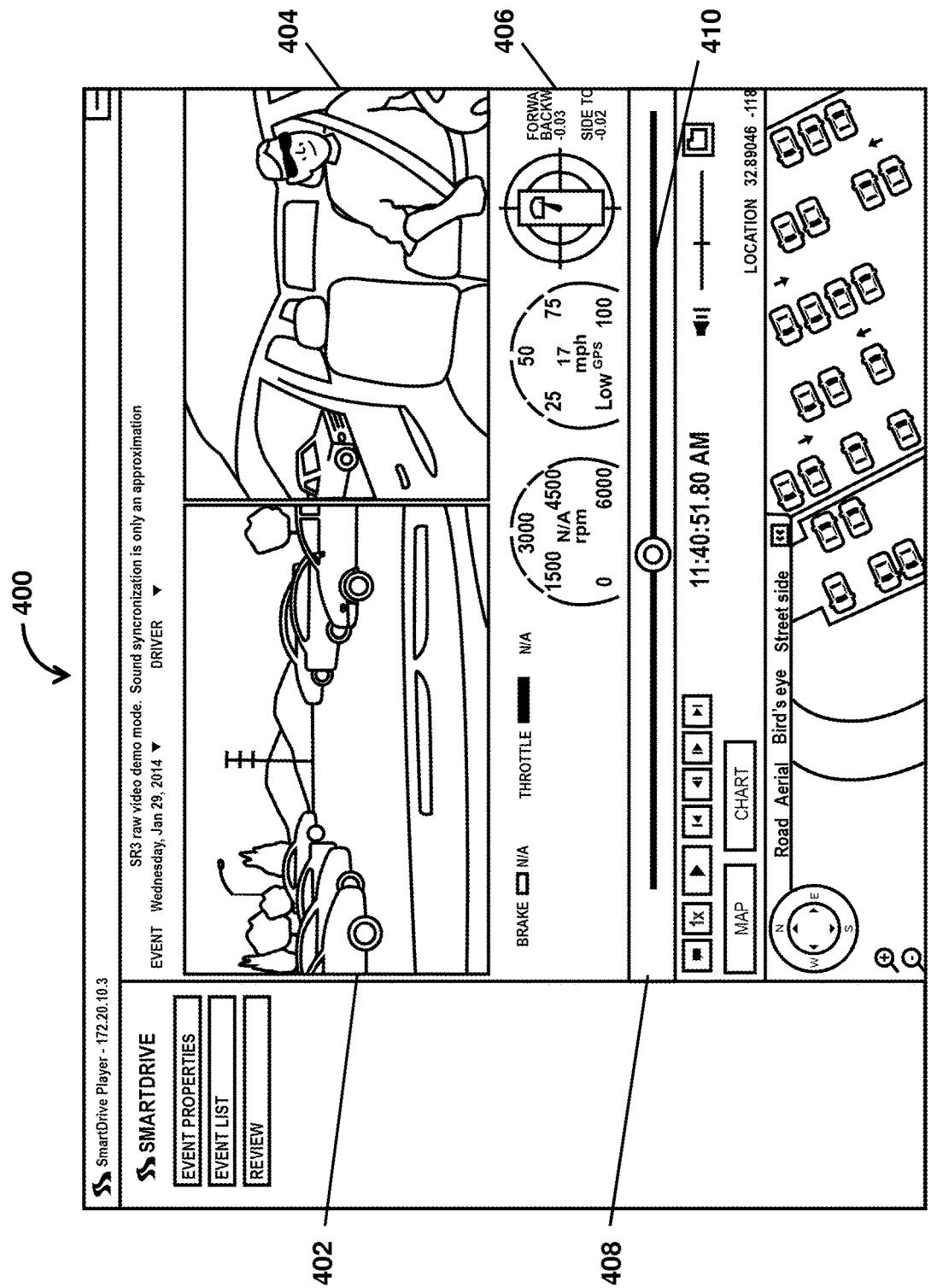
FIG. 4 illustrates another view of a reviewer interface.

Referring to FIG. 4, in some implementations, customizable reviewer interface 126 may include a view 400. View 400 may have one or more fields including fields 402 and 404 which may display the visual output information from individual ones of the fields of view corresponding to the video capture devices 114. In some implementations, view 400 may have one or more fields which may display review criteria for the visual output information displayed in any or both of fields 402 or 404, based on the individual ones of the fields of view. In some implementations, view 400 may include a field 406 which may display a portion of the vehicle operation information generated from the output signals from one or more sensors 112. In some implementations, view 400 may include field 408 which may display a timeline 410 corresponding to the time at which the displayed vehicle operation information and/or visual output information was acquired and/or conveyed.

Figure 5:
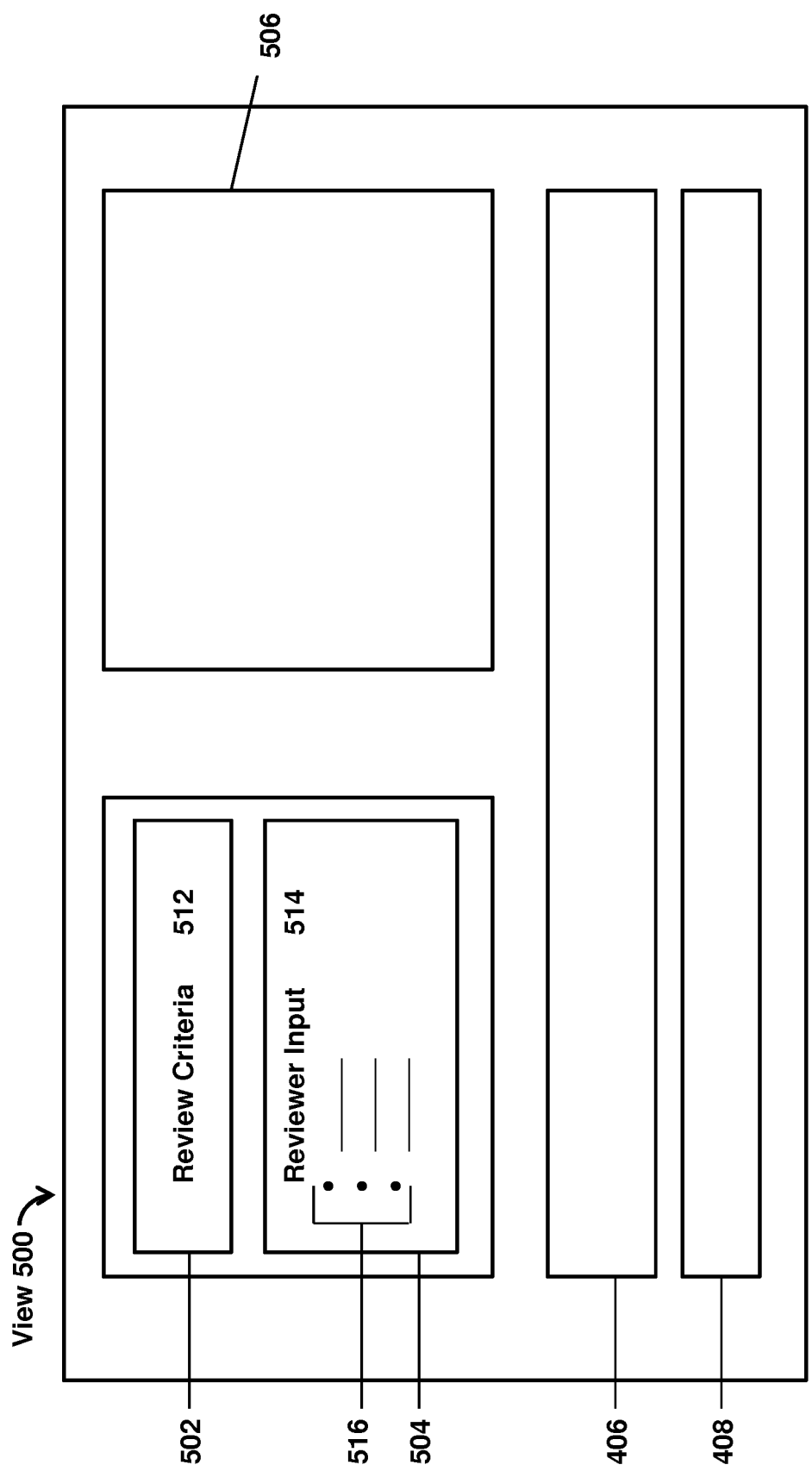
FIG. 5 illustrates another view of a reviewer interface.

Referring to FIG. 5, in some implementations, customizable reviewer interface 126 may include a view 500. View 500 may have one or more fields including field 502 which may display the review criteria 512 generated by control component 110. View 500 may include an input field 504 which may display reviewer input 514 including graphical control elements to accept reviewer selections and/or input based on the review criteria 512. The graphical control elements 516 may include, for example, one or more of a button, text field, checkbox, radio button, dropdown list, list box, slider, toggle, and/or other graphical control elements 516. View 500 may include field 506 which may display the visual output information from an individual field of view corresponding to a video capture device 114.

Returning to FIG. 1, in some implementations, control component 110 may be configured to generate coaching session information that corresponds to the vehicle event for use in a coaching session. The generation of coaching session information may be generated responsive to an entry and/or selection of information during a review of the vehicle event and/or previous vehicle events of the same and/or similar vehicle event type by a manual reviewer. By way of a first non-limiting example, to provide a coaching session for proper loading and unloading of passengers, coaching session information corresponding to the vehicle event, such as the opening of a passenger door of vehicle 122, and/or previous vehicle events of the same vehicle event type, such as an interior vehicle event type, may be generated for use in a coaching session.

In some implementations, users (e.g., customers) may indicate preferences such that system 100 prioritizes individual vehicle event types. Control component 110 may be configured to include a feedback mechanism for users to rate events and receive more or less events of a given vehicle event type via reviewer interface 126, operator interface 118, and/or another interface.

In some implementations, control component 110 may be configured to alert a user if one or more video capture devices are plugged-in, enabled, and/or functioning based on the user configuration.

In some implementations, control component 110 may generate a performance score for a vehicle operator of vehicle 122 at the time of the vehicle event. The performance score may be generated based on information received and/or selected during a manual review of the specific vehicle event facilitated by the review criteria. In some implementations, the performance score may be normalized based on the one or more fields of view corresponding to the video capture devices 114 that acquire visual output information relevant to the specific vehicle event. In some implementations, the performance scores from multiple vehicle events may be averaged or combined to generate an overall performance score. In some implementations, the vehicle operation information, visual output data, and/or information from any external resources, may be associated with the generated performance score in a given event record. The associated vehicle operation information, visual output data, and/or information from any external resources 116, may be compiled and/or filtered based on the generated performance scores for use in a coaching session.

Returning to FIG. 1, system 100 may include multiple video capture devices 114 configured to acquire visual output information representing vehicle environment 124. The visual output information may include one or more given visual output information. A given visual output information may have a digital format and/or an analog format. In some implementations, the given visual output information may be acquired from system integrated video capture devices 114 and/or non-system integrated video capture devices (e.g., external resources 116). Non-system integrated video capture devices may be located on the exterior and/or interior of vehicle 122, in vehicle environment 124, and/or other locations. In some implementations, system 100 includes external resources 116 such as an adapter. External resources 116 may include one or more of an adaptor and/or multiple resources that combine to create an adaptor. The adaptor may be configured to convert analog information to digital information. In some implementations, the adaptor of system 100 may convert a given visual output information having the analog format to a given visual output information having a digital format. The adaptor of system 100 may properly terminate video cables and/or other cables from video capture devices 114. In some implementations, termination of visual output information may be configurable.

In some implementations, the adapter of system 100 may control and/or adapt one or more of a frame rate, a resolution, a brightness, a contrast, a saturation, an image correction, and/or other characteristics of a given visual output information which may be acquired from one or more non-system integrated video capture devices (e.g., external resources 116). By way of non-limiting example, the adaptor of system 100 may be configured to control and/or adapt characteristics of visual output information based on a vehicle event type.

In some implementations, external devices 116 may include a connection device and/or media hub (e.g., a registered jack). The connection device may include strain relief features and/or environment protection features (e.g., IP67).

Figure 6:
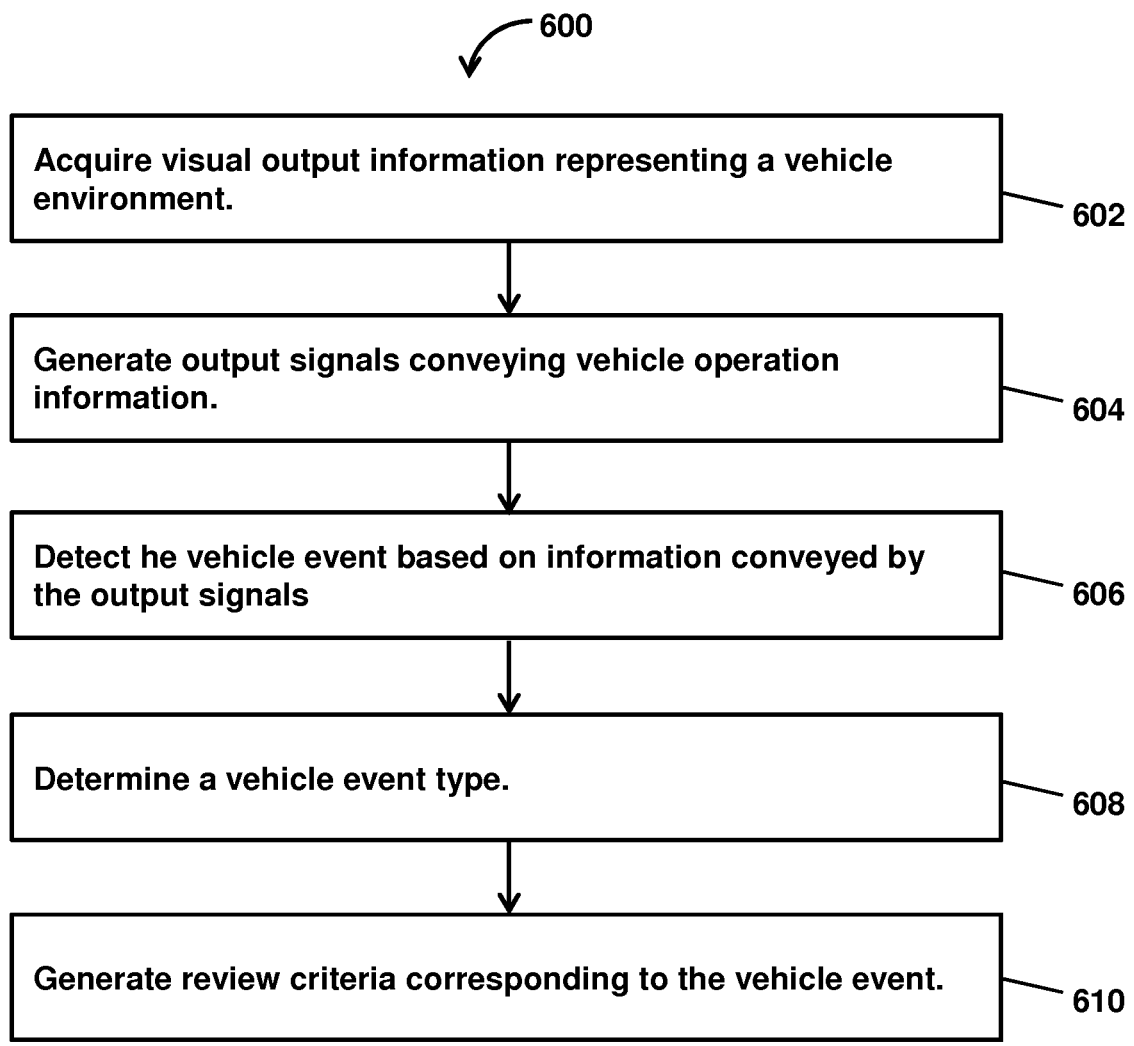
FIG. 6 illustrates a method for detecting a vehicle event and generating review criteria that correspond to the vehicle event.

FIG. 6 illustrates method 600 for detecting a vehicle event and generating review criteria that may correspond to the vehicle event. The operations of method 600 presented below are intended to be illustrative. In some implementations, method 600 may be accomplished with one or more additional operations not described, and/or without one or more of the operations discussed. Additionally, the order in which the operations of method 600 are illustrated (in FIG. 6) and described below is not intended to be limiting. In some implementations, two or more of the operations may occur substantially simultaneously.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on one or more electronic storage mediums. The one or more processing devices may include one or more devices configured through hardware, firmware, and/or software to be specifically designed for execution of one or more of the operations of method 600.

Referring to FIG. 6 and method 600, at an operation 602, visual output information representing the vehicle environment and/or other visual output information, may be acquired from individual video capture devices which may have separate corresponding fields of view of the vehicle environment. The vehicle environment may include spaces in and around the interior and exterior of the vehicle and/or other spaces. The separate corresponding fields of view may include, for example, one or more of a forward view, a rear view, a passenger's side view, a driver's side view, a driver view, a cargo view, a left view, a right view, and/or other suitable corresponding fields of view. In some implementations, acquiring visual output information from individual video capture devices may include acquiring visual output information from individual system video capture devices and or individual non-system integrated capture devices. Operation 602 may be performed by one or more video capture devices similar to/or the same as video capture devices 114 (shown in FIG. 1 and described herein.)

At an operation 604, output signals conveying vehicle operation information related to the operation and/or context of the vehicle may be generated by one or more sensors. The vehicle operation information conveyed by the output signals may be related to one or more of mechanical systems of the vehicle, movement of the vehicle, an orientation of the vehicle, a geographic position of the vehicle, a spatial position of the vehicle relative to other objects, and/or other operational/contextual characteristics of the vehicle. In some implementations, the sensors may include a camera and the output signals may include visual output information. In some implementations, the output signals may convey information related to mechanical systems of the vehicle. The output signals conveying information related to mechanical systems of the vehicle may be generated by one or more vehicle subsystem sensors included in a vehicle on-board data system. In some implementations, operation 604 may be performed by one or more sensors the same as or similar to sensors 112 (shown in FIG. 1 and described herein).

At an operation 606, a vehicle event may be detected based on information conveyed by the output signals, and/or other information. In some implementations, the vehicle event may be detected based on, for example, information or signals related to one or more of acceleration and/or deceleration, a direction of travel, a vehicle speed, an engine speed (e.g. RPM), a duration of time, a closing distance, a lane departure, a following distance, another vehicle in close proximity, a person in close proximity, an open door or compartment, a geolocation, and/or other vehicle events of vehicle. The detection may be in real-time or near real-time. The detection may be based on the information conveyed by the output signals from the one or more sensors, the visual output information from multiple video capture devices, and/or other information. In some implementations, a set of parameters may describe the vehicle event and the vehicle event may be detected based on those parameters. In some implementations, operation 606 may be performed by a processor component the same as or similar to detection component 106 (shown in FIG. 1 and described herein).

In some implementations, operation 606 may include wireless communication of the vehicle operation information and/or the visual output information. The facilitation of the wireless communication may be in real-time, near real-time, and/or other time. The facilitation of the wireless communication may be responsive to the detection of the vehicle event. The vehicle operation information and the visual output information that is wirelessly communicated may include information for a period of time that may include the vehicle event and/or other information. The information may include, for example, video and/or other data associated with a vehicle event and/or the vehicle environment. In some implementations, operation 606 may be performed by a processor component the same as or similar to control component 110 (shown in FIG. 1 and described herein).

In some implementations, operation 606 may include electronic storage of the vehicle operation information and/or the visual output information. Facilitation of the electronic storage may be responsive to the detection of the vehicle event. The electronically stored information may include the information for the period of time that may include the vehicle event and/or other information. In some implementations, operation 606 may be performed by a processor component and/or electronic storage the same as or similar to control component 110 and/or electronic storage 118 (shown in FIG. 1 and described herein).

At an operation 608, a vehicle event type may be determined based on the vehicle operation information conveyed by the output signals, the visual output information from multiple video capture devices, information from external resources, and/or other information. The determination of a vehicle event type may be responsive to the detection of the vehicle event. In some implementations, the vehicle event type may be determined based on visual output information that may be acquired from multiple video capture devices. The video capture devices may have individual corresponding fields of view. In some implementations, the vehicle event type may be determined based on information conveyed by the individual corresponding fields of view of the video capture devices. The vehicle event type may include more than one vehicle event type and/or one or more vehicle event subtypes. Operation 608 may be performed by a processor component the same as or similar to classification component 108 (shown in FIG. 1 and described herein.)

At an operation 610, review criteria may be generated that correspond to the vehicle event. The review criteria may be based on the vehicle event type, the fields of view corresponding to the video capture devices, and/or other information. In some implementations, at operation 610, it may be determined which video capture devices may have acquired visual output information relevant to the detected vehicle event based on their corresponding fields of view. Review criteria may be generated for the visual output information acquired by these individual video capture devices 114. For example, review criteria generated for a rear view may be different that review criteria generated for a side view. In some implementations, the review criteria may be generated based on corresponding fields of view of non-system integrated video capture devices. Non-system integrated video capture devices may be located, for example, in the vehicle environment, on the vehicle, on other vehicles, and/or other locations. Operation 610 may be performed by a processor component similar to/or the same as control component 110 (shown in FIG. 1 and described herein.)

Figure 7:
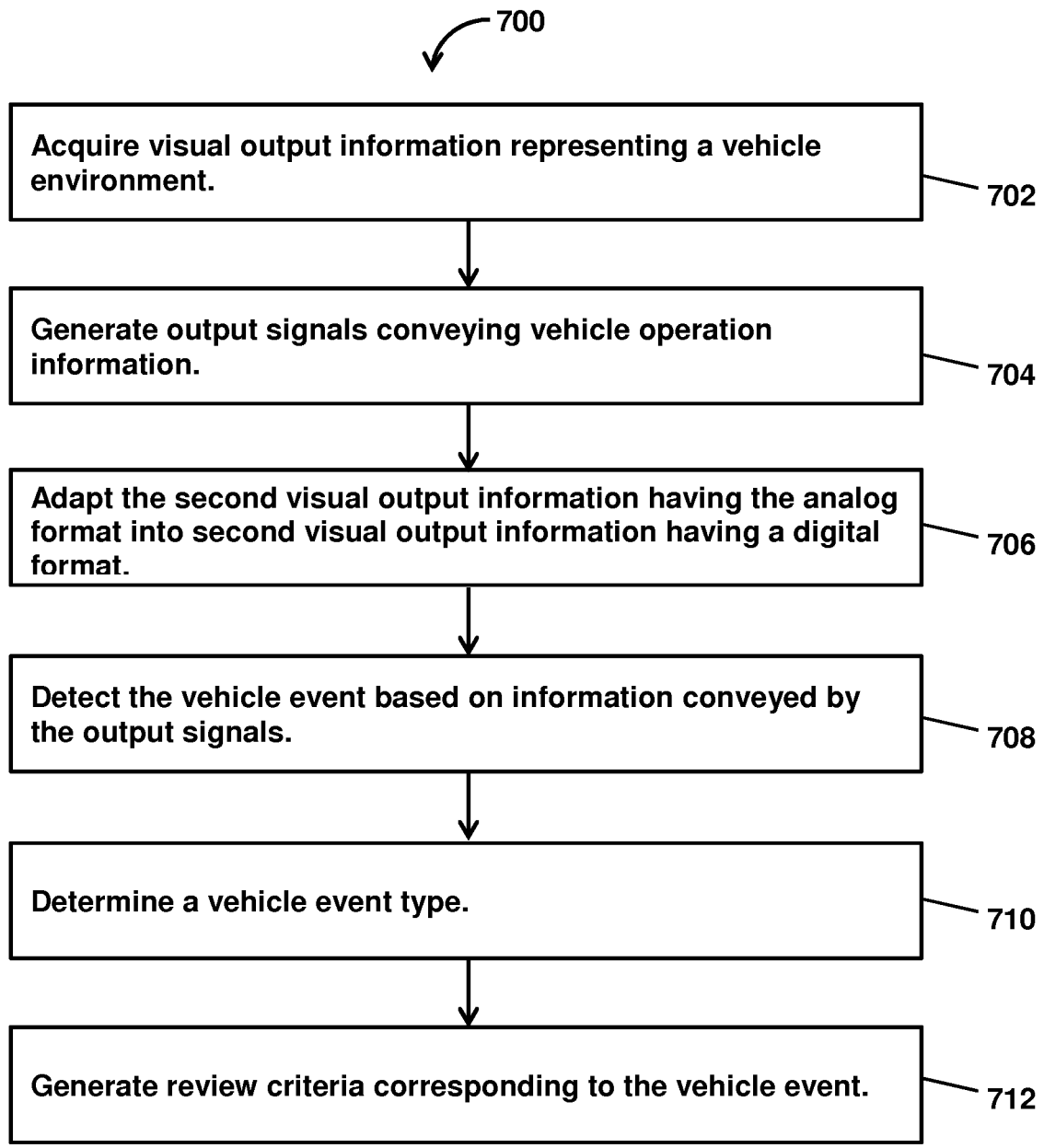
FIG. 7 illustrates another method for detecting a vehicle event and generating review criteria that correspond to the vehicle event.

FIG. 7 illustrates method 700 for detecting a vehicle event and generating review criteria 502 that may correspond to the vehicle event. The operations of method 700 presented below are intended to be illustrative. In some implementations, method 700 may be accomplished with one or more additional operations not described, and/or without one or more of the operations discussed. Additionally, the order in which the operations of method 700 are illustrated (in FIG. 7) and described below is not intended to be limiting. In some implementations, two or more of the operations may occur substantially simultaneously.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on one or more electronic storage mediums. The one or more processing devices may include one or more devices configured through hardware, firmware, and/or software to be specifically designed for execution of one or more of the operations of method 700.

Referring to FIG. 7 and method 700, at an operation 702, visual output information representing a vehicle environment and/or other visual output information, may be acquired from individual video capture devices which may have separate corresponding fields of view of the vehicle environment. The vehicle environment may include spaces in and around the interior and exterior of the vehicle and/or other spaces. The separate corresponding fields of view include, for example, one or more of a forward view, a rear view, a passenger's side view, a driver's side view, a driver view, a cargo view, a left view, a right view, and/or other suitable corresponding fields of view. The visual output information may include one or more given visual output information. The given visual output information may have a digital format and/or an analog format. In some implementations, a given visual output information having an analog format may be acquired from non-system integrated video capture devices and/or system integrated video capture devices. Operation 702 may be performed by one or more video capture devices similar to/or the same as video capture devices 114 (shown in FIG. 1 and described herein.)

At an operation 704, output signals conveying vehicle operation information related to the operation and/or context of the vehicle may be generated by one or more sensors. The vehicle operation information conveyed by the output signals may be related to one or more of mechanical systems of the vehicle, movement of the vehicle, an orientation of the vehicle, a geographic position of the vehicle, a spatial position of the vehicle relative to other objects, and/or other operational/contextual characteristics of the vehicle. In some implementations, the sensors may include a camera and the output signals may include visual output information. In some implementations, the output signals may convey information related to mechanical systems of the vehicle. The output signals conveying information related to mechanical systems of the vehicle may be generated by one or more vehicle subsystem sensors included in a vehicle on-board data system. In some implementations, operation 704 may be performed by one or more sensors the same as or similar to sensors 112 (shown in FIG. 1 and described herein).

At operation 706, the given visual output information having an analog format may be adapted into a given visual output having a digital format. An adapted given visual output and a non-adapted given visual output may then have the same format. In some implementations, one or more given visual outputs may be converged onto a timeline. The timeline may present the visual output information according to when it was acquired. In some implementations, operation 706 may be performed by one or more external resources the same as or similar to external resources 116 (shown in FIG. 1 and described herein).

At an operation 708, a vehicle event may be detected based on information conveyed by the output signals. In some implementations, the vehicle event may include, for example, information or signals related to one or more of acceleration or deceleration, a direction of travel, a vehicle speed, an engine speed (e.g. RPM), a duration of time, a closing distance, a lane departure, a following distance, another vehicle in close proximity, a person in close proximity, an open door or compartment, a geolocation, and/or other vehicle events of vehicle. The detection may be in real-time or near real-time. The detection may be based on the information conveyed by the output signals from the one or more sensors, the visual output information from multiple video capture devices, and/or other information. In some implementations, the vehicle event may have associated predetermined criteria. The detection of the vehicle event may be based on one or more determined vehicle event parameters satisfying predetermined criteria. In some implementations, operation 708 may be performed by a processor component the same as or similar to detection component 106 (shown in FIG. 1 and described herein).

At an operation 708, wireless communication of the vehicle operation information and the visual output information may be facilitated. The facilitation of the wireless communication may be in real-time or near real-time. The facilitation of the wireless communication may be responsive to the detection of the vehicle event. The vehicle operation information and/or the visual output information that is wirelessly communicated may include information for a period of time that may include the vehicle event and/or other information. The information may include, for example, video and/or other data associated with a vehicle event and/or the vehicle surroundings. In some implementations, operation 708 may be performed by a processor component the same as or similar to control component 110 (shown in FIG. 1 and described herein).

At an operation 708, electronic storage of the vehicle operation information and/or the visual output information may be facilitated. Facilitation of the electronic storage may be responsive to the detection of the vehicle event. The electronically stored information may include the information for the period of time that may include the vehicle event and/or other information. In some implementations, operation 708 may be performed by a processor component and/or electronic storage the same as or similar to control component 110 and/or electronic storage 118 (shown in FIG. 1 and described herein).

At an operation 710, a vehicle event type may be determined based on information conveyed by the output signals. The determination of a vehicle event type may be responsive to the detection of a vehicle event. In some implementations, the vehicle event type may be determined based on visual output information that may be acquired from multiple video capture devices. The video capture devices may have individual corresponding fields of view. In some implementations, the vehicle event type may be determined based on the individual corresponding fields of view of the video capture devices. The vehicle event type may include more than one vehicle event types and/or one or more vehicle event subtypes. A vehicle event may have more than one vehicle event type. In some implementations, responsive to a review, by a manual reviewer, of the vehicle event and/or previous vehicle events of the same vehicle event type determined at operation 710, method 700 may include generating coaching session information that corresponds to the vehicle event for use in a coaching session.

At an operation 712, review criteria may be generated that correspond to the vehicle event. The review criteria may be based on the vehicle event type and the fields of view corresponding to the video capture devices. For example, review criteria generated for a rear view may be different that review criteria generated for a side view. In some implementations, the review criteria may be generated based on corresponding fields of view of non-system integrated video capture devices. Non-system integrated video capture devices may be located, for example, in the vehicle environment, on the vehicle, on other vehicles, and/or in other locations. In some implementations, operation 712 may be performed by a processor component the same as or similar to control component 110 (shown in FIG. 1 and described herein).

Returning to FIG. 1, operator interface 118 and/or reviewer interface 126 are configured to provide an interface between system 100 and users through which the users may provide information to and receive information from system 100. Users may include an operator, reviewer, and/or other user. This enables pre-determined profiles, criteria, data, cues, results, instructions, review criteria, and/or any other communicable items, collectively referred to as "information," to be communicated between an operator and one or more of processor 102, sensors 112, video capture devices 114, vehicle 122, remote computing device 128, and/or other components of system 100.

In some embodiments, operator interface 118 and/or reviewer interface 126 may be included in remote computing device 128. Examples of interface devices suitable for facilitating an operator and/or reviewer interface 126 comprise a keypad, buttons, switches, a keyboard, knobs, levers, a display screen, a touch screen, speakers, a microphone, an indicator light, an audible alarm, a printer, a tactile feedback device, and/or other interface devices. In one implementation, remote computing device 128 comprises a plurality of separate interfaces. In one implementation, reviewer interface 126 comprises at least one interface that is provided integrally with processor 102 and/or electronic storage 120.

It is to be understood that other communication techniques, either hard-wired or wireless, are also contemplated by the present disclosure as operator interface 118 and/or reviewer interface 126 included in remote computing device 128. For example, the present disclosure contemplates that operator interface 118 and/or the reviewer interface 126 included in remote computing device 128 may be integrated with a cellular and/or wireless (Wi-Fi) connection. In some implementations, operator interface 118 and/or the reviewer interface 126 included in remote computing device 128, may be included in a removable storage interface provided by electronic storage 120 (although this implementation may not be as scalable as integration with a cellular and/or wireless connection). In these examples, information may be loaded into system 100 wirelessly from a remote location, from removable storage (e.g., a smart card, a flash drive, a removable disk, etc.), and/or other sources that enable the user(s) to customize the implementation of system 100. Other exemplary input devices and techniques adapted for use with system 100 as reviewer interface 126 and/or operator interface 118 comprise, but are not limited to, an RS-232 port, RF link, an IR link, modem (telephone, cable, and/or other modems), a cellular network, a Wi-Fi network, a local area network, and/or other devices and/or systems. In short, any technique for communicating information with system 100 is contemplated by the present disclosure as user interface 118 and/or the user interface included in remote computing device 128.

Electronic storage 120 may comprise electronic storage media that electronically stores information. The electronic storage media of electronic storage 120 may comprise one or both of system storage that is provided integrally (e.g., substantially non-removable) with system 100 and/or removable storage that is removably connectable to system 100 via, for example, a port (e.g., a USB port, a firewire port, etc.) or a drive (e.g., a disk drive, etc.). Electronic storage 120 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may store software algorithms, recorded video event data, information determined by processor 102, information received via operator interface 118, information received via reviewer interface 126, and/or other information that enables system 100 to function properly. Electronic storage 120 may be (in whole or in part) a separate component within system 100, or electronic storage 120 may be provided (in whole or in part) integrally with one or more other components of system 100.

Remote computing device 128 may include one or more processors, reviewer interface 126, operator interface 118, electronic storage, and/or other components. Remote computing device 128 may be configured to enable an operator and/or reviewer to interface with system 100 (e.g., as described above), and/or provide other functionality attributed herein to remote computing device 128. Remote computing device 128 may be configured to communicate with processor 102 via a network such as the internet, cellular network, Wi-Fi network, Ethernet, and other interconnected computer networks. Remote computing device 128 may facilitate viewing and/or analysis of the information conveyed by the output signals of sensors 112, the visual output information from video capture devices 114, the information determined by processor 102, the information stored by electronic storage 120, information from any external resources 116, and/or other information. By way of non-limiting example, remote computing device 128 may include one or more of a server, a server cluster, desktop computer, a laptop computer, a handheld computer, a tablet computing platform, a NetBook, a Smartphone, a gaming console, and/or other computing platforms.

In some implementations, remote computing device 128 may be and/or include a server. The server may include communication lines, or ports to enable the exchange of information with a network, processor 102 of system 100, and/or other computing platforms. The server may include a plurality of processors, electronic storage, hardware, software, and/or firmware components operating together to provide the functionality attributed herein to remote computing device 128. For example, the server may be implemented by a cloud of computing platforms operating together as a system server.

As described above, processor 102 may be configured to provide information processing capabilities in system 100. As such, processor 102 may comprise one or more of a digital processor, an analog processor, a digital circuit designed to process information, an analog circuit designed to process information, a state machine, and/or other mechanisms for electronically processing information. Although processor 102 is shown in FIG. 1 as a single entity, this is for illustrative purposes only. In some implementations, processor 102 may comprise a plurality of processing units. These processing units may be physically located within the same device (e.g., a vehicle event recorder), or processor 102 may represent processing functionality of a plurality of devices operating in coordination.

Processor 102 may be configured to execute components 104, 106, 108, and/or 110 by software; hardware; firmware; some combination of software, hardware, and/or firmware; and/or other mechanisms for configuring processing capabilities on processor 102. It should be appreciated that although components 104, 106, 108, and 110 are illustrated in FIG. 1 as being co-located within a single processing unit, in implementations in which processor 102 comprises multiple processing units, one or more of components 104, 106, 108, and/or 110 may be located remotely from the other components. The description of the functionality provided by the different components 104, 106, 108, and/or 110 described herein is for illustrative purposes, and is not intended to be limiting, as any of components 104, 106, 108, and/or 110 may provide more or less functionality than is described. For example, one or more of components 104, 106, 108, and/or 110 may be eliminated, and some or all of its functionality may be provided by other components 104, 106, 108, and/or 110. As another example, processor 102 may be configured to execute one or more additional components that may perform some or all of the functionality attributed below to one of components 104, 106, 108, and/or 110.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to detect a vehicle event and generate review criteria for manual review, wherein the review criteria correspond to the vehicle event, a portion of the system configured to couple with a vehicle, the system comprising:
    multiple video capture devices configured to acquire visual output information representing a vehicle environment, the individual video capture devices having separate corresponding fields of view of the vehicle environment, the vehicle environment including spaces in and around an interior and an exterior of the vehicle;
    one or more sensors configured to generate output signals conveying vehicle operation information related to the operation and/or context of the vehicle; and
    one or more physical computer processors configured by computer readable instructions to:
        detect, in real-time or near real-time, the vehicle event based on the vehicle operation information conveyed by the output signals;
        determine a vehicle event type based on the vehicle operation information conveyed by the output signals;
        responsive to the detection of the vehicle event, generate one or more review criteria that correspond to the detected vehicle event, wherein the one or more review criteria are generated based on the vehicle event type, wherein the one or more review criteria include one or more of a question, an inquiry, or a prompt for a manual reviewer, wherein the one or more review criteria are used to prompt the manual reviewer to provide manual reviewer input describing the detected vehicle event based on the acquired visual output information;
        facilitate communication of:
            (i) the vehicle operation information,
            (ii) the acquired visual output information, and
            (iii) the generated one or more review criteria to a remote computing device that is remote and separate from the vehicle;
        facilitate, at the remote computing device, display of a customizable reviewer interface, wherein the customizable reviewer interface displays, to the manual reviewer:
            (i) the generated one or more review criteria to prompt the manual reviewer to provide the manual reviewer input describing the detected vehicle event based on the acquired visual output information,
            (ii) a portion of the vehicle operation information generated during the detected vehicle event,
            (iii) an input field configured to accept the manual reviewer input from the manual reviewer describing the detected vehicle event, and
            (iv) a portion of the acquired visual output information acquired during the detected vehicle event, wherein the portion of the acquired visual output information includes individual ones of the fields of view corresponding to the video capture devices, wherein the manual reviewer input received from the manual reviewer is responsive to one or more of the question, the inquiry, or the prompt describing the detected vehicle event, and wherein the manual reviewer input is based on the acquired visual output information; and
        generate a vehicle event record for the vehicle event, wherein the vehicle event record includes the manual reviewer input.

2. The system of claim 1, wherein the generated one or more review criteria are further generated based on corresponding fields of view of individual non-system integrated video capture devices.

3. The system of claim 1, wherein the detection of the vehicle event is based on the vehicle operation information conveyed by the output signals that correspond to a set of parameters that describe the vehicle event.

4. The system of claim 1, wherein the vehicle event type is further determined based on the acquired visual output information acquired from the multiple video capture devices.

5. The system of claim 1, wherein the one or more physical computer processors are further configured, responsive to a review of the detected vehicle event and/or previous detected vehicle events of the same vehicle event type by the manual reviewer, to generate coaching session information that corresponds to the detected vehicle event and/or previous detected vehicle events for use in a coaching session, wherein the coaching session information is different from the manual reviewer input.

6. The system of claim 1, wherein the one or more physical computer processors are further configured, responsive to the detection of the vehicle event, to facilitate electronic storage of the of the vehicle operation information and the acquired visual output information.

7. The system of claim 1, wherein the one or more physical computer processors are further configured to generate a performance score for a vehicle operator of the vehicle at the time of the detected vehicle event based on the manual review by the manual reviewer.

8. The system of claim 1, wherein the generated one or more review criteria include first review criteria for a first individual field of view corresponding to a first individual video capture device and second review criteria for a second individual field of view corresponding to a second individual video capture device, and wherein the first review criteria is different from the second review criteria based on the first individual field of view being different from the second individual field of view.

9. A system configured to detect a vehicle event and generate review criteria for manual review, wherein the review criteria correspond to the vehicle event, at least a portion of the system configured to couple with a vehicle, the system comprising:

multiple video capture devices configured to acquire visual output information representing a vehicle environment from individual video capture devices having separate corresponding fields of view of the vehicle environment, the vehicle environment including spaces in and around an interior and an exterior of the vehicle, the visual output information including a first visual output information and second visual output information,
  the first visual output information having a digital format and being generated by an individual one of the multiple video capture devices that is a system integrated video capture device, and
  the second visual output information having an analog format and being generated by an individual one of the multiple video capture devices that is a non-system integrated video capture device;
one or more sensors configured to generate output signals conveying vehicle operation information related to the operation and/or context of the vehicle;
an adapter configured to convert analog information to digital information such that the second visual output information having the analog format is converted into second visual output information having a digital format; and
one or more physical computer processors configured by computer readable instructions to:
  detect, in real-time or near real-time, the vehicle event based on the vehicle operation information conveyed by the output signals;
  determine a vehicle event type based on the vehicle operation information conveyed by the output signals;
  responsive to the detection of the vehicle event, generate one or more review criteria that corresponds to the vehicle event, wherein the one or more review criteria are generated based on the vehicle event type, wherein the one or more review criteria include one or more of a question, an inquiry, or a prompt for a manual reviewer, wherein the one or more review criteria are used to prompt the manual reviewer to provide manual reviewer input describing the detected vehicle event based on the acquired visual output information;
  facilitate communication of:
    (i) the vehicle operation information,
    (ii) the acquired visual output information, and
    (iii) the generated one or more review criteria to a remote computing device that is remote and separate from the vehicle; and
  facilitate, at the remote computing device, display of a customizable reviewer interface, wherein the customizable reviewer interface displays, to the manual reviewer:
    (i) the generated one or more review criteria to prompt the manual reviewer to provide the manual reviewer input describing the detected vehicle event based on the acquired visual output information,
    (ii) a portion of the vehicle operation information generated during the detected vehicle event,
    (iii) an input field configured to accept the manual reviewer input from the manual reviewer describing the detected vehicle event, and
    (iv) a portion of the acquired visual output information acquired during the detected vehicle event, wherein the portion of the acquired visual output information includes individual ones of the fields of view corresponding to the video capture devices, wherein the manual reviewer input received from the manual reviewer is responsive to one or more of the question, the inquiry, or the prompt describing the detected vehicle event, and wherein the manual reviewer input is based on the acquired visual output information.

10. The system of claim 8, wherein the adapter is further configured to facilitate adapting one or more characteristics of the first visual output information and/or the second visual output information, the characteristics including one or more of a frame rate, a resolution, a brightness, a contrast, a saturation, or an image correction.

11. The system of claim 9, wherein the generated one or more review criteria include first review criteria for a first individual field of view corresponding to a first individual video capture device and second review criteria for a second individual field of view corresponding to a second individual video capture device, and wherein the first review criteria is different from the second review criteria based on the first individual field of view being different from the second individual field of view.

12. A method for detecting a vehicle event and generating review criteria for manual review, wherein the review criteria correspond to the vehicle event, the method comprising:

acquiring visual output information representing a vehicle environment from individual video capture devices having separate corresponding fields of view of the vehicle environment, the vehicle environment including spaces in and around an interior and an exterior of the vehicle;
generating output signals conveying vehicle operation information related to the operation and/or context of the vehicle;
detecting, in real-time or near real-time, the vehicle event based on the vehicle operation information conveyed by the output signals;
determining a vehicle event type based on the vehicle operation information conveyed by the output signals;
generating one or more review criteria that correspond to the detected vehicle event, wherein the one or more review criteria are generated based on the vehicle event type, wherein the one or more review criteria include one or more of a question, an inquiry, or a prompt for a manual reviewer, wherein the one or more review criteria are used to prompt the manual reviewer to provide manual reviewer input describing the detected vehicle event based on the acquired visual output information;
facilitating communication of:
(i) the vehicle operation information,
(ii) the acquired visual output information, and
(iii) the generated one or more review criteria to a remote computing device that is remote and separate from the vehicle;
facilitating, at the remote computing device, display of a customizable reviewer interface to the manual reviewer, wherein the customizable reviewer interface displays, to the manual reviewer:
(i) the generated one or more review criteria to prompt the manual reviewer to provide the manual reviewer input describing the detected vehicle event based on the acquired visual output information, wherein the manual reviewer input is based on the acquired visual output information,
(ii) an input field to accept the manual reviewer input from the manual reviewer describing the detected vehicle event,
(iii) a portion of the vehicle operation information generated during the detected vehicle event, and
(iv) a portion of the acquired visual output information acquired during the detected vehicle event, wherein the portion of the acquired visual output information includes individual ones of the fields of view corresponding to the video capture devices; and
accepting, by the input field, the manual reviewer input from the manual reviewer, wherein the manual reviewer input is responsive to one or more of the question, the inquiry, or the prompt describing the detected vehicle event, and wherein the manual reviewer input is based on the acquired visual output information.

13. The method of claim 12, wherein generating the one or more review criteria is further based on corresponding fields of view of individual non-system integrated video capture devices.

14. The method of claim 12, further comprising determining a set of parameters that describe the vehicle event for detecting the vehicle event.

15. The method of claim 12, wherein determining the vehicle event type is further based on the acquired visual output information acquired from the multiple video capture devices.

16. The method of claim 12, further comprising, responsive to a review of the detected vehicle event and/or previous detected vehicle events of the same vehicle event type by the manual reviewer, generating coaching session information that corresponds to the detected vehicle event and/or previous detected vehicle events for use in a coaching session, wherein the coaching session information is different from the manual reviewer input.

17. The method of claim 12, further comprising, responsive to the detection of the vehicle event, facilitating electronic storage of the vehicle operation information and the acquired visual output information.

18. The method of claim 12, further comprising, generating a performance score for a vehicle operator of the vehicle at the time of the vehicle event based on a manual review by the manual reviewer.

19. The method of claim 12, wherein the generated one or more review criteria include first review criteria for a first individual field of view corresponding to a first individual video capture device and second review criteria for a second individual field of view corresponding to a second individual video capture device, and wherein the first review criteria is different from the second review criteria based on the first individual field of view being different from the second individual field of view.

20. A method for detecting a vehicle event and generating review criteria for manual review, wherein the review criteria correspond to the vehicle event, the method comprising:
acquiring visual output information representing a vehicle environment from individual video capture devices having separate corresponding fields of view of the vehicle environment, the vehicle environment including spaces in and around an interior and an exterior of the vehicle, the visual output information including first visual output information and second visual output information,
the first visual output information having a digital format and being generated by an individual one of the multiple video capture devices that is a system integrated video capture device, and
the second visual output information having an analog format and being generated by an individual one of the multiple video capture devices that is a non-system integrated video capture device;
generating output signals conveying vehicle operation information related to the operation and/or context of the vehicle;
adapting the second visual output information having the analog format into second visual output information having a digital format;
detecting, in real-time or near real-time, the vehicle event based on the vehicle operation information conveyed by the output signals;
determining a vehicle event type based on the vehicle operation information conveyed by the output signals;
responsive to the detection of the vehicle event, generating one or more review criteria that correspond to the detected vehicle event, wherein the one or more review criteria are generated based on the vehicle event type, wherein the one or more review criteria include one or more of a question, an inquiry, or a prompt for a manual reviewer, wherein the one or more review criteria are used to prompt the manual reviewer to provide manual reviewer input describing the detected vehicle event based on the acquired visual output information;
facilitating communication of the vehicle operation information, the acquired visual output information and the generated one or more review criteria to a remote computing device that is remote and separate from the vehicle;

facilitating, at the remote computing device, display of a customizable reviewer interface to the manual reviewer, wherein the customizable reviewer interface displays:
  (i) the generated one or more review criteria to prompt the manual reviewer to provide the manual reviewer input describing the detected vehicle event based on the acquired visual output information, wherein the manual reviewer input is based on the acquired visual output information,
  (ii) a portion of the vehicle operation information generated during the detected vehicle event,
  (iii) an input field to accept the manual reviewer input from the manual reviewer describing the detected vehicle event, and
  (iv) a portion of the acquired visual output information acquired during the detected vehicle event, wherein the portion of the acquired visual output information includes individual ones of the fields of view corresponding to the video capture devices; and accepting, by the input field, the manual reviewer input from the manual reviewer, wherein the manual reviewer input is responsive to one or more of the question, the inquiry, or the prompt describing the detected vehicle event, and wherein the manual reviewer input is based on the acquired visual output information.

21. The method of claim 20, further comprising adapting one or more characteristics of the first visual output information and/or the second visual output information, the characteristics including one or more of a frame rate, a resolution, a brightness, a contrast, a saturation, or an image correction.

22. The method of claim 20, wherein the generated one or more review criteria include first review criteria for a first individual field of view corresponding to a first individual video capture device and second review criteria for a second individual field of view corresponding to a second individual video capture device, and wherein the first review criteria is different from the second review criteria based on the first individual field of view being different from the second individual field of view.

* * * * *